(12) United States Patent
Sharifi et al.

(10) Patent No.: US 8,895,830 B1
(45) Date of Patent: Nov. 25, 2014

(54) INTERACTIVE GAME BASED ON USER GENERATED MUSIC CONTENT

(71) Applicant: Google Inc., Mountain View, CA (US)

(72) Inventors: Matthew Sharifi, Zurich (CH); Gheorghe Postelnicu, Zurich (CH); Aviv Reznik, Rüschlikon (CH)

(73) Assignee: Google Inc., Mountain View, GA (US)

( * ) Notice: Subject to any disclaimer, the term of this patent is extended or adjusted under 35 U.S.C. 154(b) by 11 days.

(21) Appl. No.: 13/647,345

(22) Filed: Oct. 8, 2012

(51) Int. Cl.
A63F 9/00 (2006.01)
A63F 13/00 (2014.01)

(52) U.S. Cl.
USPC .............................................. 84/609; 381/56

(58) Field of Classification Search
CPC ............. G10H 1/40; G10H 1/00; G07F 17/32
USPC .................. 463/35; 84/609; 381/56
See application file for complete search history.

(56) References Cited

U.S. PATENT DOCUMENTS

2010/0223223 A1* 9/2010 Sandler et al. .................. 706/50

OTHER PUBLICATIONS

Guitar Hero, http://hub.guitarhero.com/, 1 page, Activision Publishing, Inc., Last accessed Oct. 9, 2012.

* cited by examiner

Primary Examiner — Reginald Renwick
(74) Attorney, Agent, or Firm — Amin, Turocy & Watson, LLP

(57) ABSTRACT

Systems and methods are provided herein relating to interactive gaming within a media sharing service. Game data, such as sets of notes extracted from the audio track of user generated videos or from audio samples, can be generated based on videos containing musical content or from audio content. A device can use the game data to facilitate an interactive game during playback of the user generated videos or audio samples. Players can press buttons, for example, corresponding to notes as the video with musical content is played within the game interface. Players can be scored for accuracy, and can play with other players in a multiplayer environment. In this sense, user generated video content or audio content can be transformed and used within a gaming interface to increase interaction and engagement between users in a media sharing service.

18 Claims, 22 Drawing Sheets

INTERACTIVE GAME BASED ON USER GENERATED MUSIC CONTENT

TECHNICAL FIELD

This application relates to interactive gaming, and more particularly to using user generated music content within the interactive game.

BACKGROUND

Media sharing services have become prolific on the internet as connection speeds have increased giving consumers the ability to upload, for example, their own personal videos. Most media sharing services act strictly as an intermediary, for example, they give the user a forum to display the user's version of a video. The media sharing service can then host the user uploaded media allowing other users on the internet the ability to view the uploaded media.

In some media sharing services, much of user uploaded media contains musical content, such as user generated musical content. For example, users may upload media with innovative renditions of well known songs or original user content. Musical content can be highly interactive. For example, those consuming media with musical content can sing along, dance, play instruments, etc. In most media sharing services, the interactive nature of this content is not used beyond displaying the user generated music content to another user that has chosen to consume it. Thus, it is desirable that user generated music content be enhanced to facilitate more interaction with the users that consume the media content.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to building game data. A receiving component can receive a set of videos wherein videos in the set of videos contain an audio track. In an alternative implementation, audio unrelated to video content can be received. A spectrogram component can generate a spectrogram of the audio track for videos in the set of videos. A chromagram component can generate a chromagram of the audio track of respective videos in the set of videos based on the spectrogram. A note extraction component can extract a set of notes from the chromagram for respective videos in the set of videos wherein notes in the set of notes contain a timestamp and a frequency index.

Systems and methods disclosed herein further relate to using built game data within an interactive game. A user device such as a smart phone, tablet, personal computer, etc. can be capable of playing the interactive game. The device can contain a receiving component that receives a video and an associated set of notes wherein notes in the set of notes contain a time and a frequency bin. A display component can display the video. A game interface component can, during display of the video, dynamically display notes within the set of notes as a button of a set of buttons based on the time and the frequency bin associated with the note wherein the set of buttons are associated with differing user inputs. An input component can receive user inputs from the device during display of the video. A scoring component can dynamically score user inputs on a scale of accuracy based on the displayed notes.

Systems and methods disclosed herein also relate to using built game data related to ambient audio for use within an interactive game. A user device such as a smart phone, tablet, personal computer, etc. can be capable of playing the interactive game. A capture component can capture an audio sample from a microphone or the memory wherein the audio sample is associated with an initial time stamp. An output component can send the audio sample and the initial time stamp to an audio matching system. A receiving component can, in response to the output component sending the audio sample and the initial time stamp, receive metadata relating to the audio sample, a set of notes, a correspondence point, and a time stretch factor wherein the correspondence point is associated with an audio sample correspondence time and a reference sample correspondence time. A display component can during playback of the audio sample, dynamically display notes in the set of notes based on a current time stamp, the initial time stamp, the audio sample correspondence time, the reference sample correspondence time, and the time stretch factor. A game interface component that during display of the notes in the set of notes, can dynamically display notes within the set of notes as a button of a set of buttons based on a time and a frequency bin associated with the note wherein the set of buttons are associated with differing user inputs. An input component can receive user inputs from the device during display of the set of notes. A scoring component can dynamically score user inputs as accurate or inaccurate based on displayed notes.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
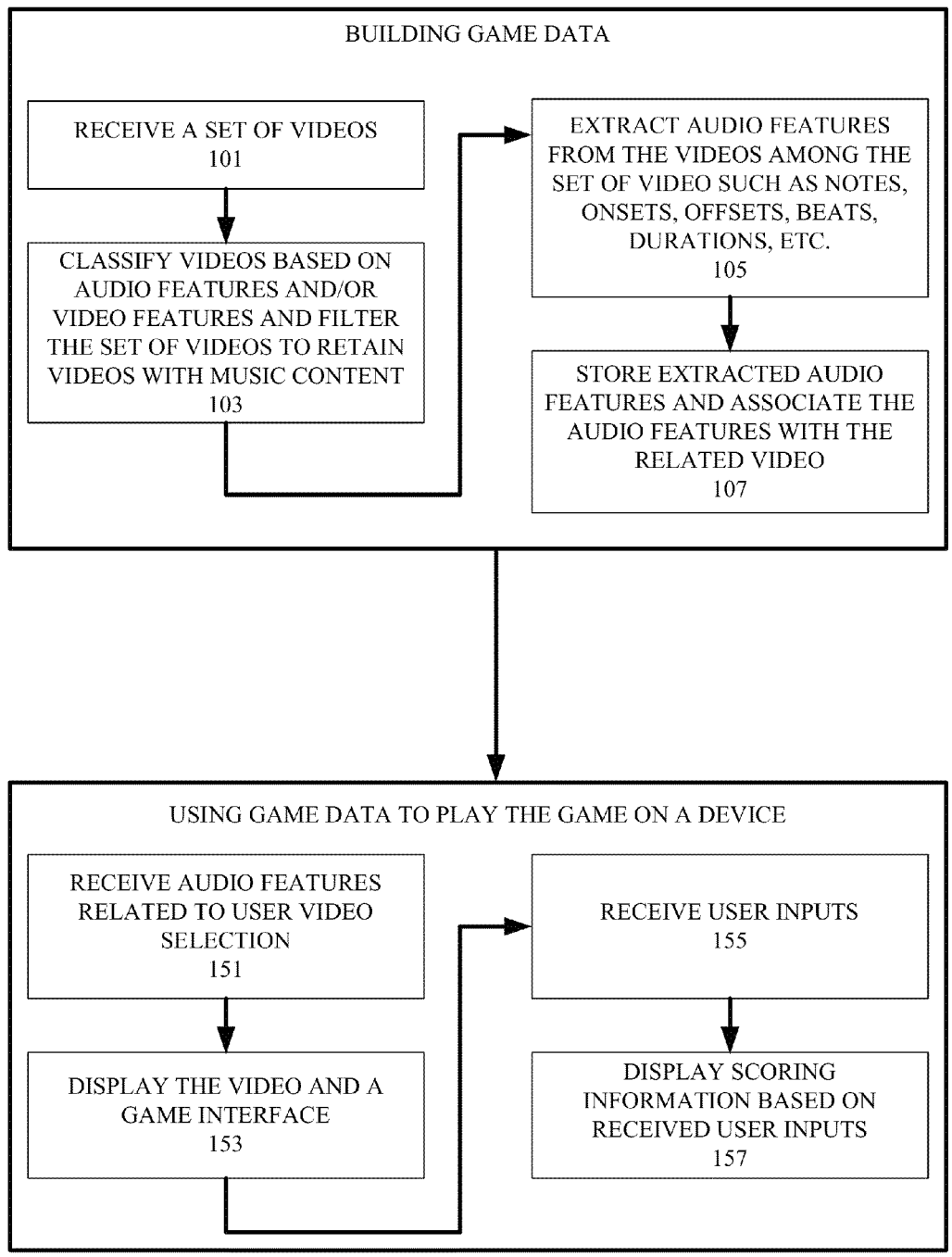
FIG. 1 illustrates a high-level block diagram example of using user generated music content to build game data and using the built game data to play an interactive game in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Media sharing services can host a wide variety of user uploaded media including media that contains user generated musical content. For example, users can upload media with innovative renditions of well known songs or user original content. Musical content can be highly interactive. One way to make musical content more interactive is through the use of an interactive game based on user generated music content.

Systems and methods disclosed herein relate to building an interactive game around any music content in a media sharing service. In playing the game, the user generated music content can play as a video, while a player of the game can play along by playing notes using an on screen instrument. Prior to playing the game, however, user generated music content can be identified, and sets of notes can be extracted from the user generated music content for use within the interactive game. Thus, the disclosed systems and methods relate to first building game content derived from user generated music content, as well as using the built game content within an interactive game. It can be appreciated that building game content can occur utilizing, for example, and offline batch process which is performed on a server hosting the user generated content. It can be further appreciated that game content can be derived from audio content relating to ambient audio both related or unrelated to video content.

Referring now to FIG. 1, there is illustrated a high-level block diagram example of using user generated music content to build game data and using the built game data to play an interactive game in accordance with implementations of this disclosure. First, game data can be built. At 101, a set of videos can be received. In another implementation, a set of audio samples can be received unrelated to video content.

At 103, the videos or audio samples can be classified based on matching the audio content, audio features of the video, video features of the video, associated metadata or a combination of those features to filter the set of audio samples or videos by retaining those audio samples or videos with music content.

For example, in matching the audio content of the video, the audio track of the video can be analyzed for unique characteristics that can be used in comparison to unique characteristics of reference samples to identify the audio sample. As a starting point for this analysis, a spectrogram of the audio signal can be constructed. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at a specific frequency and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time.

A second technique involves using short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. Other techniques, such as wavelet transforms, can also be used to construct a spectrogram.

Once a spectrogram has been generated, compact descriptors or fingerprints can be generated that characterize the spectrogram. One method of calculating fingerprints is to first determine individual interest points that identify unique characteristics of local features of the time-frequency representation of the reference sample. Fingerprints can then be computed as functions of sets of interest points. Calculating interest points involves identifying unique characteristics of the spectrogram.

Fingerprints can then be used to determine whether audio content, for example audio content related to user generated videos, matches known audio content in a reference database. If the audio track of the video is a match to known music content, the video is likely to contain musical content that can be used within the interactive game.

In addition to using audio fingerprinting to potentially identify matching content, the audio track of the user generated content can be classified to determine whether the audio track is indicative of an audio track containing musical content. A classifier can be trained to recognize audio features, such as those used in audio fingerprinting, by classifying audio tracks of videos known to contain musical content. For example, a known set of videos containing musical content can be run through the classifier to identify common audio features these videos may share. Those common audio features can then be used in comparison to user generated videos, and if the user generated videos contain similar features, it may indicate that the user generated video contains musical content.

In another example, video features of the video can be used to classify the video as containing musical content. Similar to audio fingerprinting, video fingerprinting can identify unique video features of the video, also known as interest points, that can be extracted and stored as a video fingerprint, where the video fingerprint is a function of a set of interest points. Interest points can be based on extracted features such as a histogram of local features, a color histogram, edge features, a histogram of textons, face features, camera motion, shot boundary features, audio features, etc. Video fingerprints are generally much smaller than the actual video files themselves. Thus, comparing the video fingerprint of a user generated video to other video fingerprints can assist in determining if the video contains musical content.

Similar to the audio based classifier, a video based classifier can be trained to recognize video features, such as those used in video fingerprinting, by classifying videos known to contain musical content. For example, a known set of videos containing musical content can be run through the classifier to identify common traits of videos containing musical content. Those common traits can then be used in comparison to user generated videos, and if the user generated videos contain similar traits, it may indicate that the user generated video contains musical content.

In another example, metadata associated with user generated video content can be used to aid in determining whether the user generated video content contains musical content. For example, at the time of upload, users can be queried about what content is contained in their user generated videos, and metadata can be generated based on the answered queries.

At 105, audio features can be extracted from videos. As referred to above with respect to matching audio tracks of video content, a spectrogram can be generated and used in extracting audio features from videos. Once a spectrogram is generated, a chromagram representation of the audio track can be generated based on the spectrogram. A chromagram can be generated from the spectrogram by using, for example, overlapping fast Fourier transforms, and then appropriately binning each output slice and condensing the output slice into a single octave. For example, the chromagram can be generated using 24 bins which would correspond to two bins per semitone.

Notes can be extracted from the chromagram by first smoothing the chromagram to emphasize large note structures. Onsets, which are the beginning of the note, can be determined by searching for local maxima in both frequency and time of the chromagram. In order to avoid instantaneous sounds, the note can be observed over time to determine if the maxima is retained. For example, the note can be observed in time for T milliseconds (where "T" is an integer) that the same frequency index is still a local maxima in frequency during the duration of the observation. In one example, T can be set to 100. It can be appreciated that a decay can also be factored in allowing notes to decrease in strength while maintaining status as a local maxima. It can be appreciated that in an alternate implementation, notes can be extracted directly from the spectrogram.

Notes can be characterized as a time stamp and a frequency index. In one implementation, duration can also be associated with notes. The frequency index related to a video can then be quantized into a number of bins. For example, if the chromagram representation is generated using 24 bins, the frequency index associated with a set of notes can be requantized into six bins. It can be appreciated that the number of bins can be adjustable based on factors such as difficulty level, as described in more detail below in regards to playing the interactive game.

In another example, notes can be extracted by detecting beats within the chromagram, where beats are associated with a start time, an end time, and a rhythm time. For example musical content heavy on percussion or musical content lacking melodic content may have notes related to a very narrow range of the frequency index. In these cases, beats can be extracted with a start time, a stop time, and a rhythm time or beat interval. It can be appreciated that a player of the interactive game can be asked to simply tap along with the beat as described in more detail below in regards to playing the interactive game. In another implementation, random notes can be generated to accompany the beats. For example, for musical content lacking melodic content, randomly generated notes can be incorporated that allow a player of the game to play notes. It can be appreciated that by having actual beats to accompany the randomly generated notes, it can still seem realistic, because it will likely be in synch with the beat.

At 107, extracted audio features, such as notes, onsets, beats, etc. can be stored and associated with the related video, in, for example, an extracted audio feature index. The extracted audio feature index can be within the cloud and/or held on a server to be retrieved as supplementary data for videos within a media sharing service.

Using the game data stored in an extracted audio feature index, an interactive game can be played on a device. In another implementation, notes on a musical scale can be displayed on a device based on the extracted audio feature index. It can be appreciated that the device can be a smart phone, a tablet, an e-reader, a personal computer, etc. At 151, audio features can be received related to a user video selection. At 153, the both the video and the game interface can be displayed to the user on their device as described in more detail in FIGS. 2 and 3. At 155, user inputs can be received related to playing the game. At 157, scoring can be displayed within the game interface based on the received user inputs.

Figure 2:
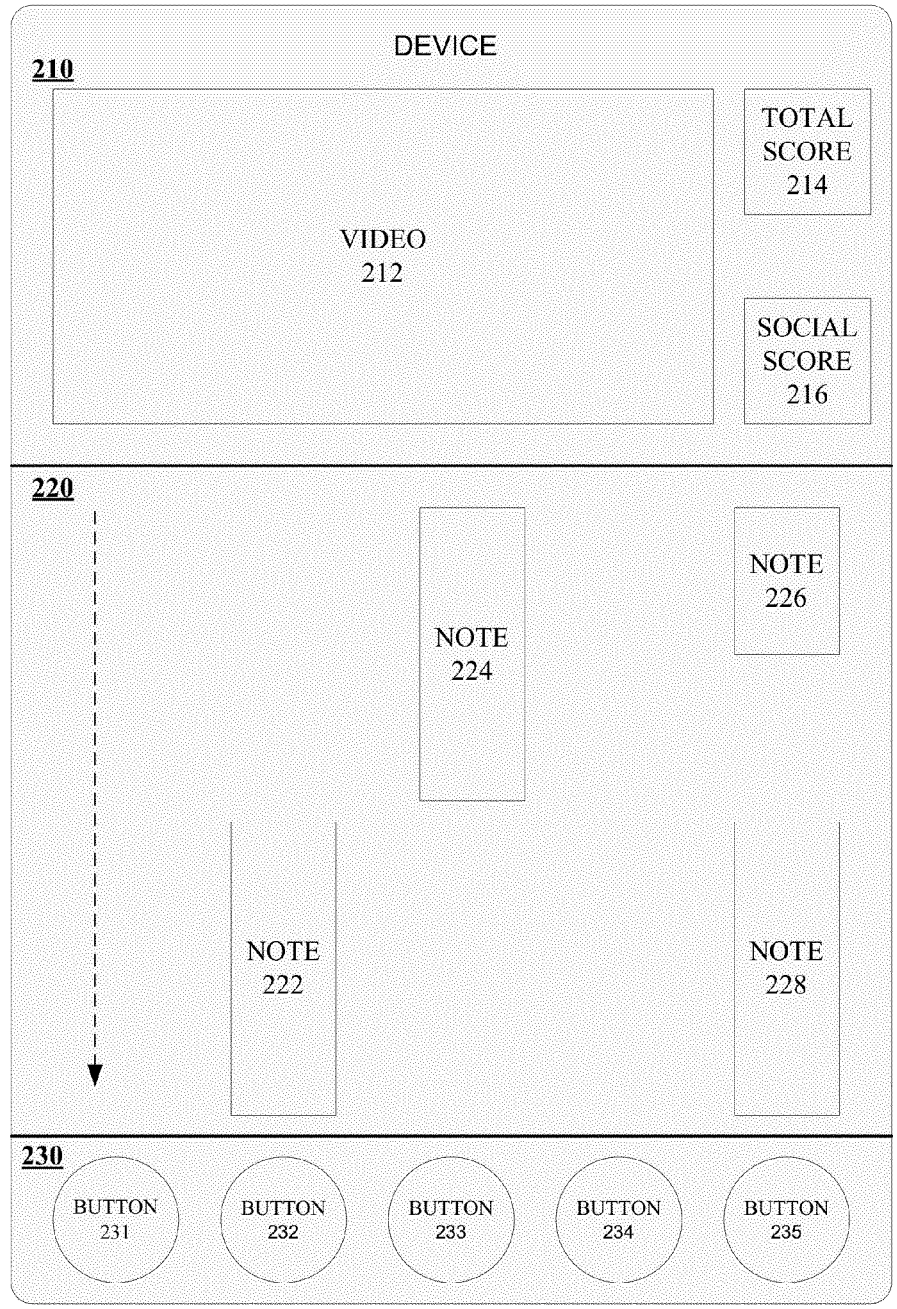
FIG. 2 illustrates a non-limiting example game interface on a device in accordance with implementations of this disclosure.

Referring now to FIG. 2, there is illustrated a non-limiting example game interface on a device in accordance with implementations of this disclosure. It can be appreciated that the device can be a smart phone, a tablet, an e-reader, a personal computer, etc. The device is broken down into three distinct zones for ease of explanation. It can be appreciated that items like total score 214 or social score 216 could conceivably be located within any zone of the game interface. The first zone, as depicted, zone 210, has screen space for a video 212, a total score 214, and a social score 216. Video 212 can display user generated video content in its original form. It can be appreciated that as video 212 is playing, audio is also playing using any capable audio output of the device. Total score 214 can display the current score of the player of the device. Social score 216 can list the score of another player competing against the user of the device. In another implementation, social score 216 could list the highest score previously earned by the user of the device for the same video 212.

As video 212 is playing within zone 210, notes associated with video 212 can vertically scroll down within zone 220. For example, zone 220 shows four notes (note 222, note 224, note 226, and note 228). Notes can scroll vertically down the screen, and when the note reaches the bottom of zone 220, such as depicted for notes 222 and 228, the player of the game must input the appropriate button. It can be appreciated that notes can have a start time and a duration, which will correlate to the time during the video when the note is depicted within the game interface. For example, as notes 222 and 228 reach the bottom of zone 220, the player will make a user input, e.g., using a touch screen, a mouse click, a keyboard strike, etc. that corresponds with the button beneath the proper area. The button can then be held for the duration the note remains within zone 220 and released as the note no longer appears within zone 220, i.e., as the notes vertical scroll down off the screen. In this example, both button 232 and button 235 have to be pressed simultaneously as the notes to form a de facto chord. Sensitivity can be adjusted to determine whether a user input is accurate or inaccurate. For example, the length of note 222 requires a player to not only touch button 232 at the appropriate time but also hold the button until note 222 vertically scrolls and leaves zone 220 in its entirety. It may be too difficult for a player to hold the note for the entirety of the duration accurately, so instead, a player may only need to hold the note for a percentage of the duration of the note. For example, a note that is held for at least 80% of the length of the note can be deemed accurate.

In the depicted example, five distinct areas for notes to scroll vertically are shown. Each area where notes are able to scroll is associated with a button in zone 230. It can be appreciated that the five distinct areas can represent 5 sections of a frequency index. For example, the leftmost area, corresponding to the vertical area above button 231 within zone 220 can relate to the lowest notes in the scale of the frequency index. The rightmost area, corresponding to the vertical area above button 235 and containing notes 226 and 228 can relate to the highest notes in the scale of the frequency index. It can be further appreciated that the number of buttons is customizable, and can depend on, for example, a difficulty level chosen by a user of the device. The more buttons in play, the more difficult it will likely be for a player of the interactive game to accurately press the buttons in real time. For example, for a five button game layout as shown in FIG. 2, each button can correspond to a fifth of the frequency range associated with the video. Note 222 being in the second distinct area can be associated with a note within the second fifth of the frequency band. If the game layout was changed to three buttons, it is possible, for example, that note 222 could reside in either the first third of the frequency index, or the second third of the frequency index.

One way to provide feedback to a player of the game regarding the accuracy of their user inputs is to provide audible feedback during display of the video. If the player makes an inaccurate user input, audible distortions can be introduced into the video alerting the player of their error. If the user input is accurate, a tone based on the frequency bin associated with the displayed note can be introduced into the video alerting the player of their success. In one implementation, the tone introduced can be associated with an instrument native to the video, or an instrument selected by a player of the game, within a settings menu, for example.

Another way to provide feedback to a player of the game is through an aggregate score based on dynamic aggregation of accurate user inputs and inaccurate user inputs. For example, in one implementation, accurate user inputs can increase a player's score, while inaccurate user inputs can decrease a player's score. In another implementation, accurate user inputs can increase the player's score, while inaccurate user inputs have no effect on a players score. In yet another implementation, players can be awarded bonus scoring for completing certain sections of the video with complete accuracy. In still another implementation, players can be awarded bonus points for long strings of accurate user inputs without an inaccurate user input. In another implementation, chords, i.e., notes that require more than one button to be depressed at the same time can be worth a higher score than single notes. It can be appreciated that a wide range of scoring algorithms can be used to assess player accuracy. An aggregate score can dynamically aggregate the score based on a scoring algorithm and display the aggregated score within as total score 214 within zone 210.

In another aspect of the game interface, social score 216 can relate to multiplayer aspects of the game. For example, a player from a disparate device can play the game for video 212 at the same time that the player of the depicted device is playing. Or alternatively, a disparate device can play the game for video 212 at any prior date, and have their play recorded for future playback. In another example, the player's own past performances to the same video can be recorded for future playback as well. During play by a player of the depicted device, social score 216 can dynamically display the score, for the disparate user or recorded play through, at the same point in time during the current play through of the same video. A player of the device could thus compare their current total score 214 to their own past performance, a friend's current or past performance, or a random opponents current or past performance as shown in social score 216 during playback.

Figure 3:
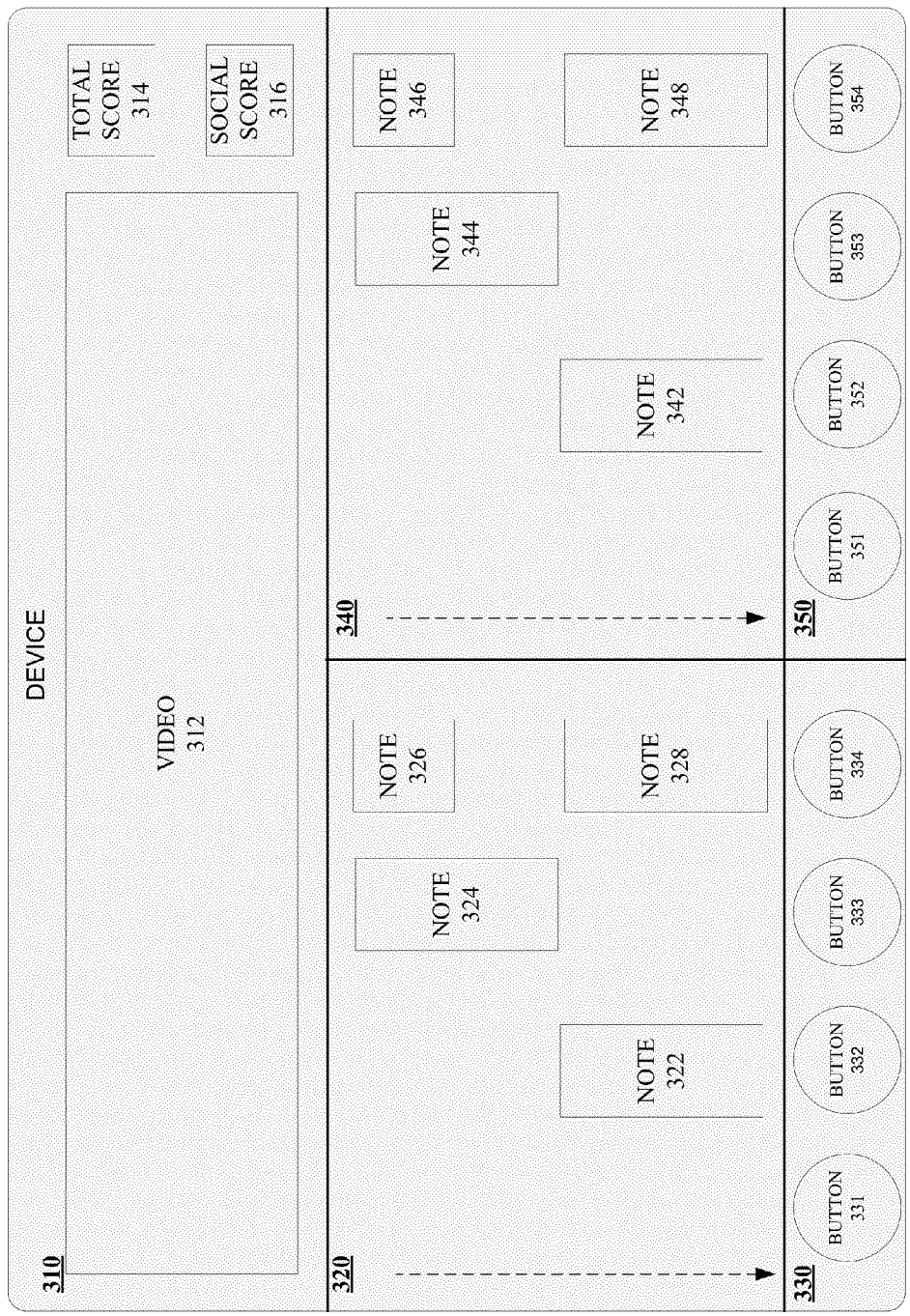
FIG. 3 illustrates a non-limiting example multiplayer game interface on a device in accordance with implementations of this disclosure.

Referring now to FIG. 3, there is illustrated a non-limiting example multiplayer game interface on a device in accordance with implementations of this disclosure. It can be appreciated that the depicted game interface is not necessary to play multiplayer versions of the game. As described above with respect to FIG. 2, multiplayer is possible on that version of the game interface as well.

Similar to what's depicted in FIG. 2, the device has multiple zones. Zone 310 contains the video 312, the total score 314, and the social score 316. Zones 320 and 330 contain one player's game play area, where 4 vertical areas of notes reside above four buttons 331-334. Notes 322, 324, 326, and 328 are scrolling vertically downwards. Unlike FIG. 2, this game interface contains a second player game area, zones 340 and 350, that contain notes 342, 344, 346, and 348 as well as buttons 351-354 respectively. This can allow for two players playing on the same device at the same time. For example, one player can use a touch screen to physically press the button on the screen, while another player could use the same touch screen, an attached keyboard, or an attached mouse. It can be appreciated that input devices can be customizable by players of the game, using, for example, a setting menu within the game interface or within a player profile associated with the game.

In another example, zones 340 and 350 can display the buttons as pressed by a disparate game player through a network connection, or from a previously recorded game play session by the same player or a different player.

Figure 4:
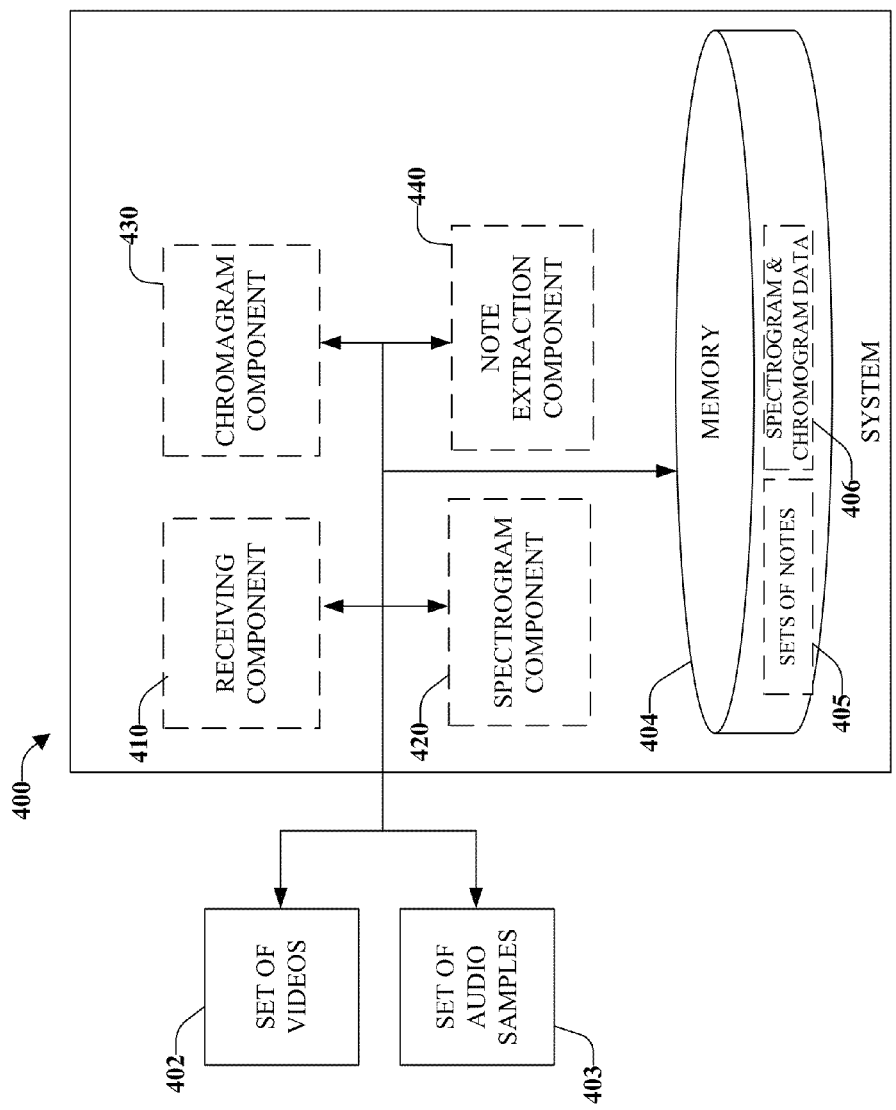
FIG. 4 illustrates a high-level functional block diagram of an example system for building game data in accordance with implementations of this disclosure.

Referring now to FIG. 4, there is illustrated a high-level functional block diagram of an example system for building game data in accordance with implementations of this disclosure. In FIG. 4, a system 400 includes a receiving component 410, a spectrogram component 420, a chromagram component 430, a note extraction component 440, and a memory 404, each of which may be coupled as illustrated. Receiving component 410 can receive a set of videos 402. In an alternative implementation, receiving component 410 can receive a set of audio samples 403 unrelated to video content. It can be appreciated that game data can be built off video with accompanying audio track containing musical content, or audio samples containing musical content unrelated to video content.

Spectrogram component 420 can generate a spectrogram of the audio track for videos in the set of videos. Alternatively, spectrogram component 420 can generate a spectrogram for respective audio samples in the set of audio samples 403. Spectrogram component 420 can store spectrogram data 406 within memory 404 for access by other components. In one implementation, spectrogram component 420 can generate the spectrogram using overlapping fast Fourier transforms.

Chromagram component 430 can generate a chromagram of the audio track of respective videos in the set of videos based on the spectrogram. Alternatively, chromagram component 430 can generate a chromagram of respective audio samples in the set of audio samples 403 based on the spectrogram. Chromagram component 430 can store chromagram data 406 within memory 404 for access by other components. In one implementation, chromagram component 430 can generate the chromagram based on a number of a bins and a single octave.

Note extraction component 440 can extract a set of notes from the chromagram for respective videos in the set of videos wherein notes in the set of notes contain a timestamp and at least one of a frequency index or a chromagram bin. Alternatively, note extraction component 440 can extract a set of notes from the chromagram for respective audio samples in the set of audio samples wherein notes in the set of notes contain a timestamp and at least one of a frequency index or a chromagram bin. In one implementation, the note extraction component 440 can extract the set of notes from the chromagram based on smoothing the chromagram to emphasize large note structures. In one implementation, note extraction component 440 can extract the set of notes from the chromagram by locating onsets, wherein onsets are local maxima of the chromagram in frequency and time. In another implementation note extraction component 440 can extract the set of notes from the chromagram by detecting beats within the chromagram, wherein beats are associated with a start time, an end time, and a rhythm time.

Figure 5:
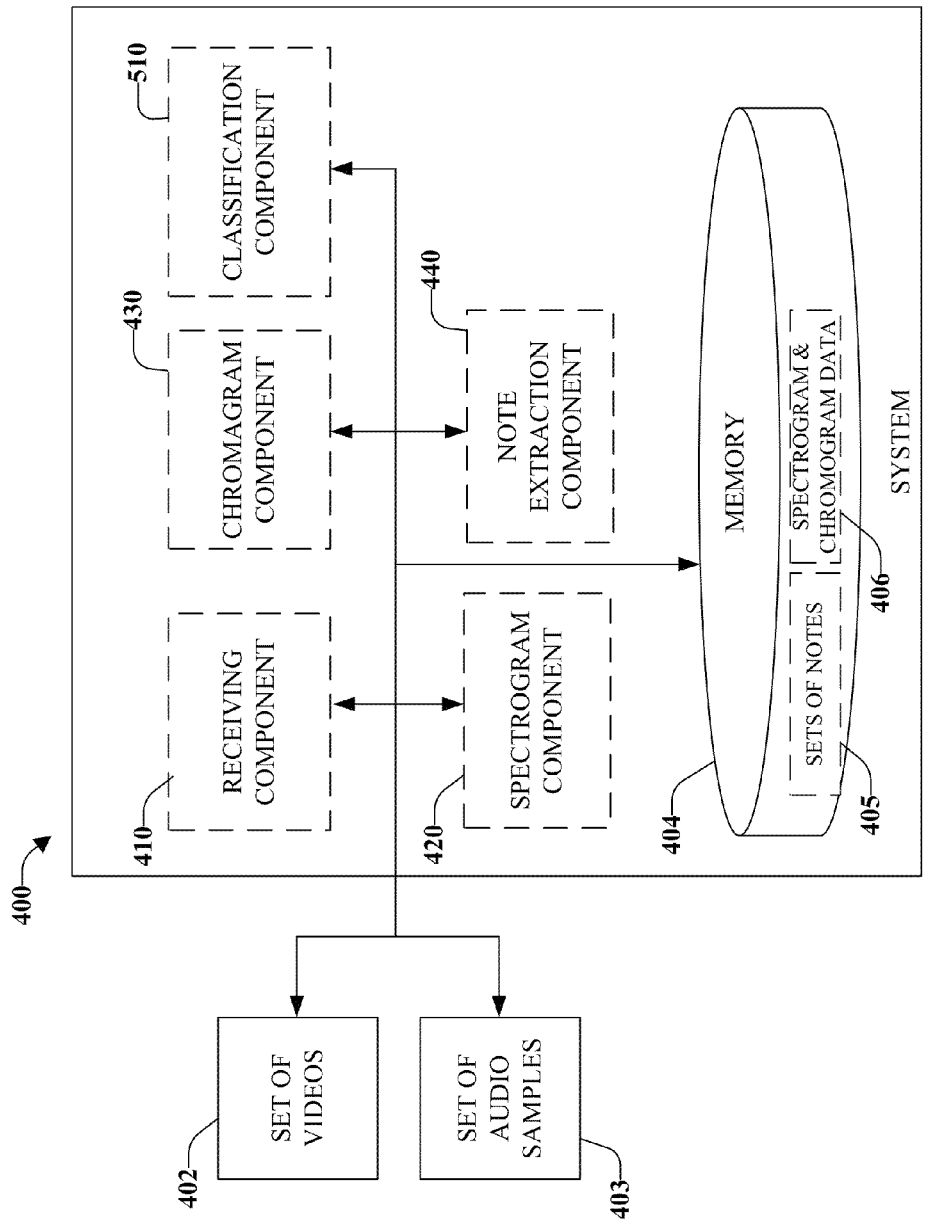
FIG. 5 illustrates a high-level functional block diagram of an example system for building game data including a classification component in accordance with implementations of this disclosure.

Referring now to FIG. 5, there is illustrated a high-level functional block diagram of an example system for building game data including a classification component 510 in accordance with implementations of this disclosure. Classification component 510 can filter the set of videos to retain videos with musical content. In one implementation, classification component 510 can filter the videos among the set of videos further based on at least one of matching the audio track, classifying the audio track, classifying video features, or reading metadata associated with the video. It can be appreciated that classification component 510 can be in communication (not depicted) with classifiers, audio matching systems, metadata stores, etc. to assist is filtering the set of videos.

Figure 6:
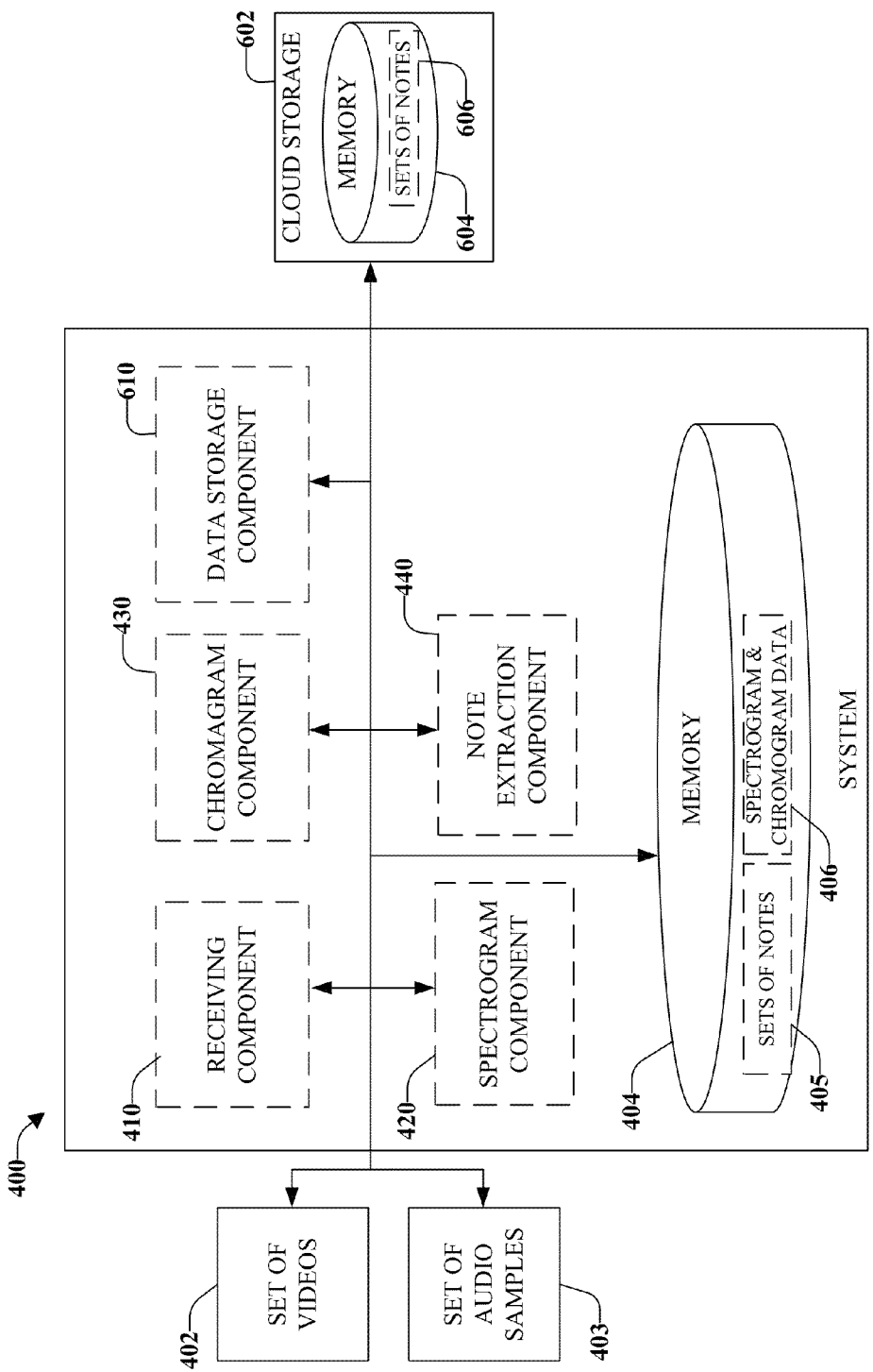
FIG. 6 illustrates a high-level functional block diagram of an example system for building game data including a data storage component in accordance with implementations of this disclosure.

Referring now to FIG. 6, there is illustrated a high-level functional block diagram of an example system for building game data including a data storage component 610 in accordance with implementations of this disclosure. Data storage component 610 can store respective sets of notes in a data store and associate the respective sets of notes with respective videos in the set of videos. For example, when a user selects to watch a video within a media sharing service, the user can be offered the option to play the interactive game from their device. If the user desires to play the interactive game, they can retrieve a set of notes associated with the video they want to play, along with the video itself, from the data store. It can be appreciated that the video content and the gaming content (i.e., the set of notes) can be located in disparate data stores.

In an alternate implementation, data storage component 610 can store respective sets of notes in a data store and associate the respective sets of notes with respective audio samples in the set of audio samples 403. For example, if a user chooses to identify an audio sample, the user can be offered the option to have the score dynamically displayed from their device while the audio sample is playing. If the user desires to have the score displayed, the device can retrieve a set of notes associated with the audio sample identified.

Figure 7:
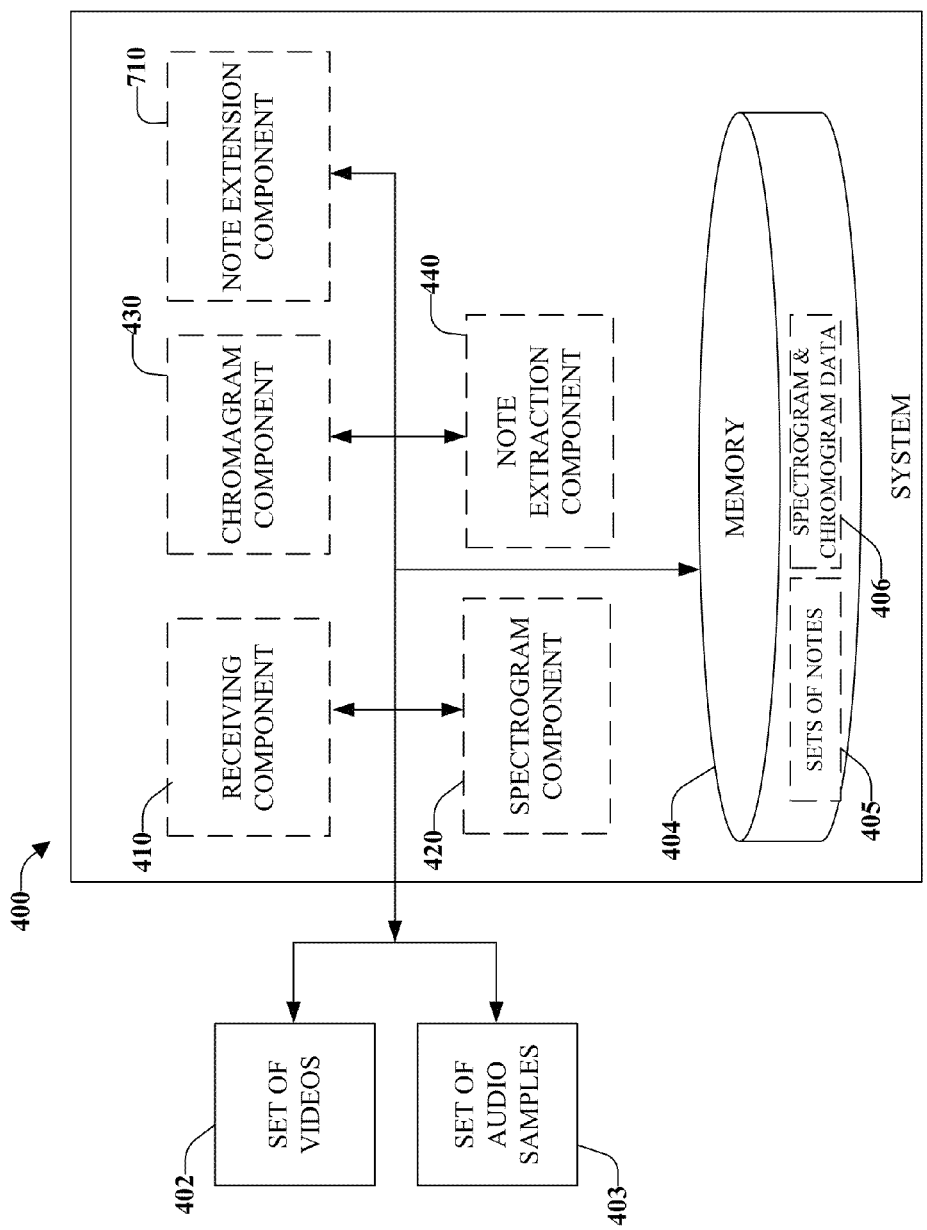
FIG. 7 illustrates a high-level functional block diagram of an example system for building game data including a note extension component in accordance with implementations of this disclosure.

Referring now to FIG. 7, there is illustrated a high-level functional block diagram of an example system for building game data including a note extension component 710 in accordance with implementations of this disclosure. Note extension component 710 can determine a duration for notes in the set of notes based on a time step wherein during the duration a note maintains a local maxima in frequency throughout a number of time steps. It can be appreciated that the duration of the note can be calculated based on the number of time steps that the note maintained itself as a local maxima in frequency. In one implementation, a duration threshold can be established where notes that do not meet the duration threshold are removed for the set of notes as instantaneous sounds rather than sounds reflecting musical content.

FIGS. 8-11 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods.

Figure 8:
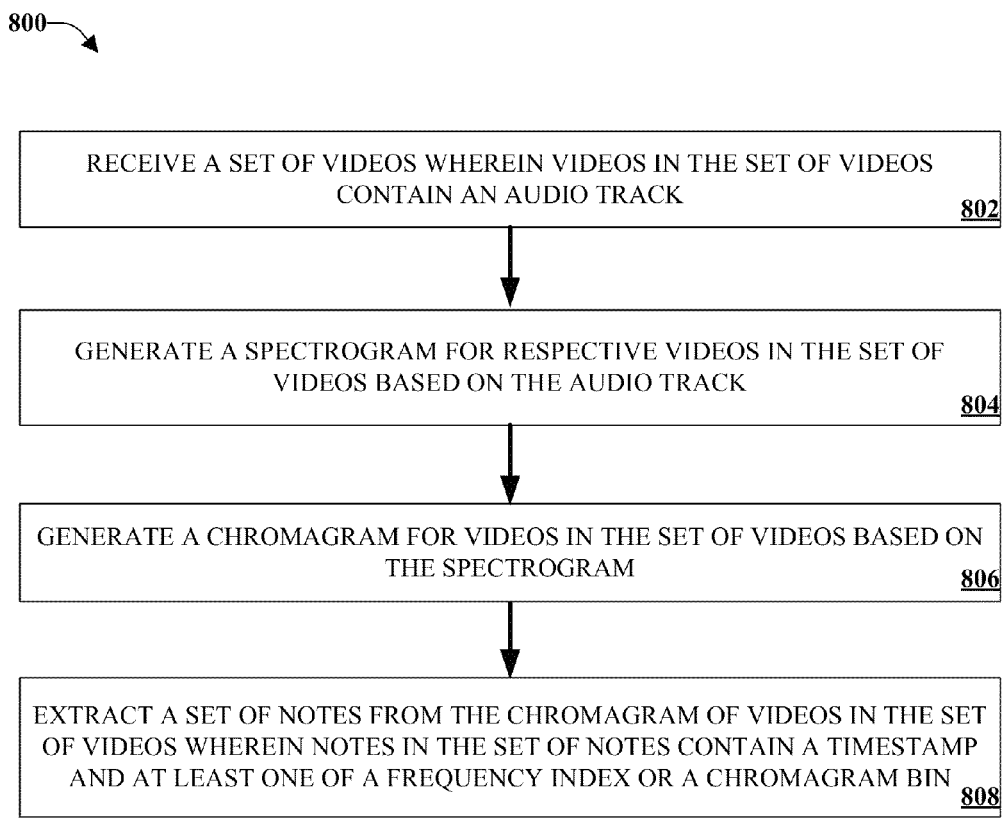
FIG. 8 illustrates an example method for building game data in accordance with implementations of this disclosure.

Referring now to FIG. 8, there is illustrated an example method for building game data in accordance with implementations of this disclosure. At 802, a set of videos can be received (e.g., by a receiving component) wherein videos in the set of videos contain an audio track. In an alternate implementation, a set of audio samples unrelated to video can be received.

At 804, a spectrogram can be generated (e.g., by a spectrogram component) for respective videos in the set of videos based on the audio track. In one implementation, the spectrogram can be generate using overlapping fast Fourier transforms. At 806, a chromagram can be generated (e.g., by a chromagram component) for videos in the set of videos based on the spectrogram. In one implementation, generating the chromagram can be based on a number of bins and a single octave.

At 808, a set of notes can be extracted (e.g., by a note extraction component) from the chromagram of videos in the set of videos wherein notes in the set of notes contain a timestamp and at least one of a frequency index or a chromagram bin. In one implementation, a set of notes can be extracted from the chromagram based on smoothing the chromagram to emphasize large note structures. In one implementation, a set of notes can be extracted from the chromagram by locating onsets, wherein onsets are local maxima of the chromagram in frequency and time. In one implementation, a set of notes can be extracted from the chromagram by detecting beats within the chromagram, wherein beats are associated with a start time, an end time, and a rhythm time.

Figure 9:
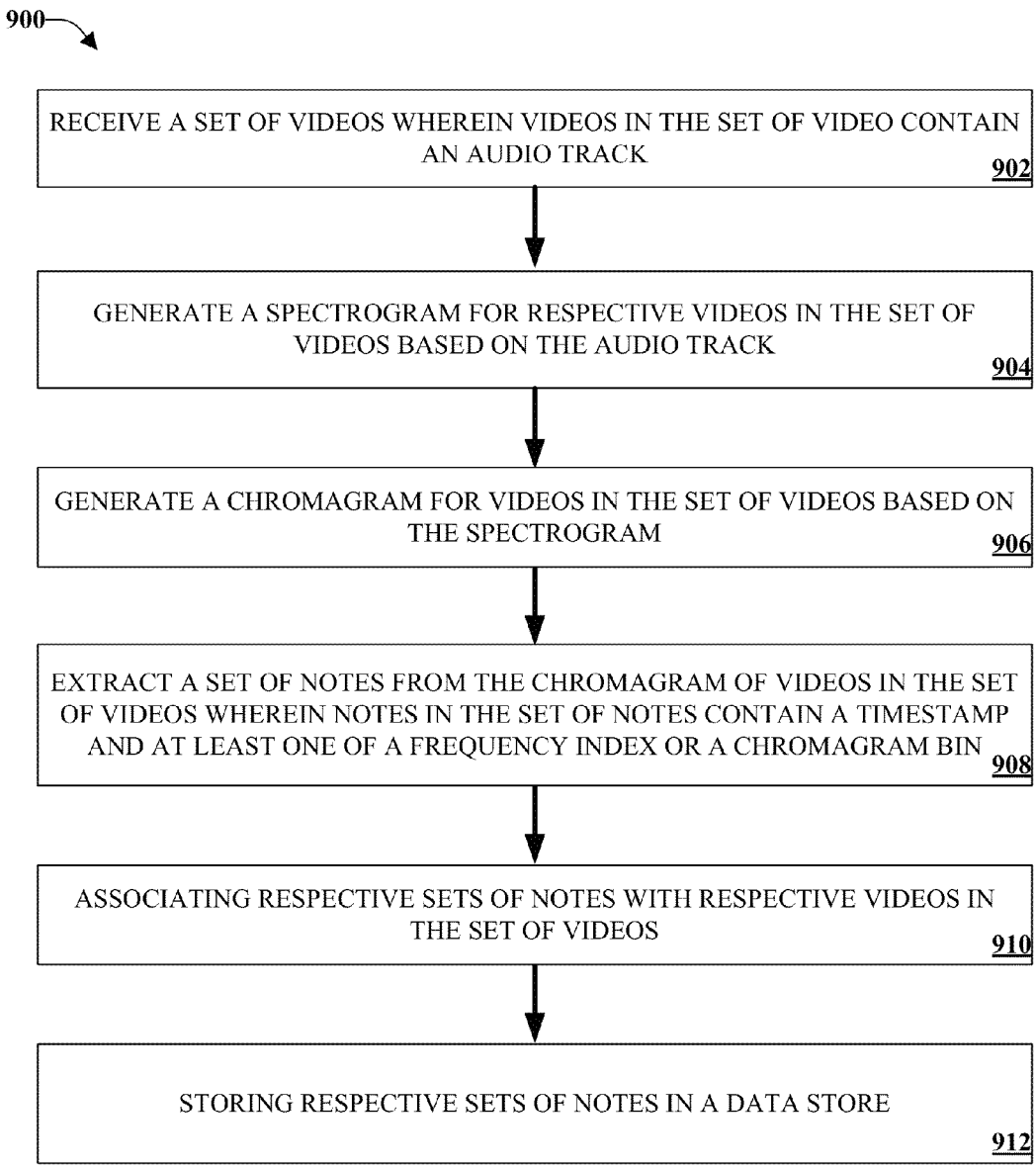
FIG. 9 illustrates an example method for building game data including storing game data in accordance with implementations of this disclosure.

Referring now to FIG. 9, there is illustrated an example method for building game data including storing game data in accordance with implementations of this disclosure. At 902, a set of videos can be received (e.g., by a receiving component) wherein videos in the set of videos contain an audio track. At 904, a spectrogram can be generated (e.g., by a spectrogram component) for respective videos in the set of videos based on the audio track. At 906, a chromagram can be generated (e.g., by a chromagram component) for videos in the set of videos based on the spectrogram. At 908, a set of notes can be extracted (e.g., by a note extraction component) from the chromagram of videos in the set of videos wherein notes in the set of notes contain a timestamp and at least one of a frequency index or a chromagram bin.

At 910, respective sets of notes can be associated (e.g., by a data storage component) with respective videos in the set of videos. At 912, respective sets of notes can be stored (e.g., by a data storage component) in a data store.

Figure 10:
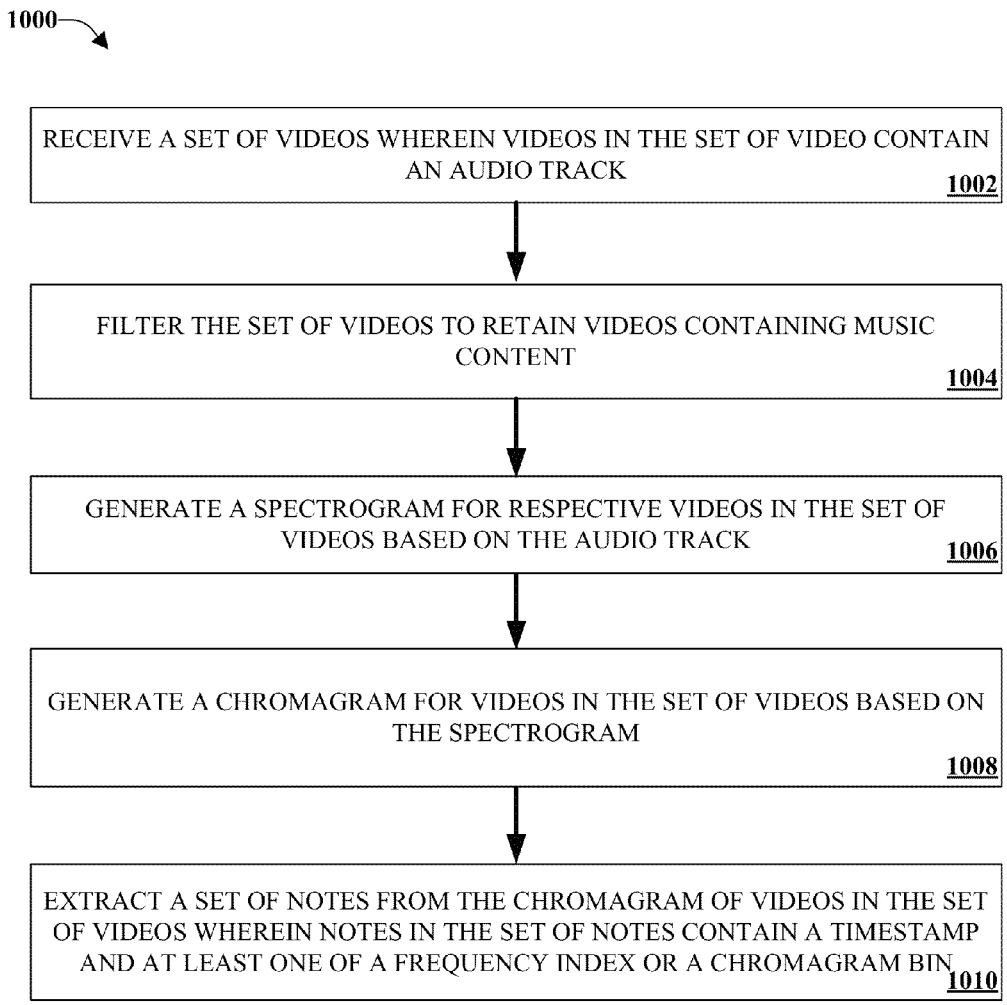
FIG. 10 illustrates an example method for building game data including filtering user generated content for music in accordance with implementations of this disclosure.

Referring now to FIG. 10, there is illustrated an example method for building game data including filtering user generated content for music in accordance with implementations of this disclosure. At 1002, a set of videos can be received (e.g., by a receiving component) wherein videos in the set of videos contain an audio track. At 1004, the set of videos can be filtered (e.g., by a classification component) to retain videos containing musical content. In one implementation, filtering the set of videos is further based on at least one of matching the audio track, classifying the audio track, classifying video features, or reading metadata associated with the video.

At 1006, a spectrogram can be generated (e.g., by a spectrogram component) for respective videos in the set of videos based on the audio track. At 1008, a chromagram can be generated (e.g., by a chromagram component) for videos in the set of videos based on the spectrogram. At 1010, a set of notes can be extracted (e.g., by a note extraction component) from the chromagram of videos in the set of videos wherein notes in the set of notes contain a timestamp and at least one of a frequency index or a chromagram bin.

Figure 11:
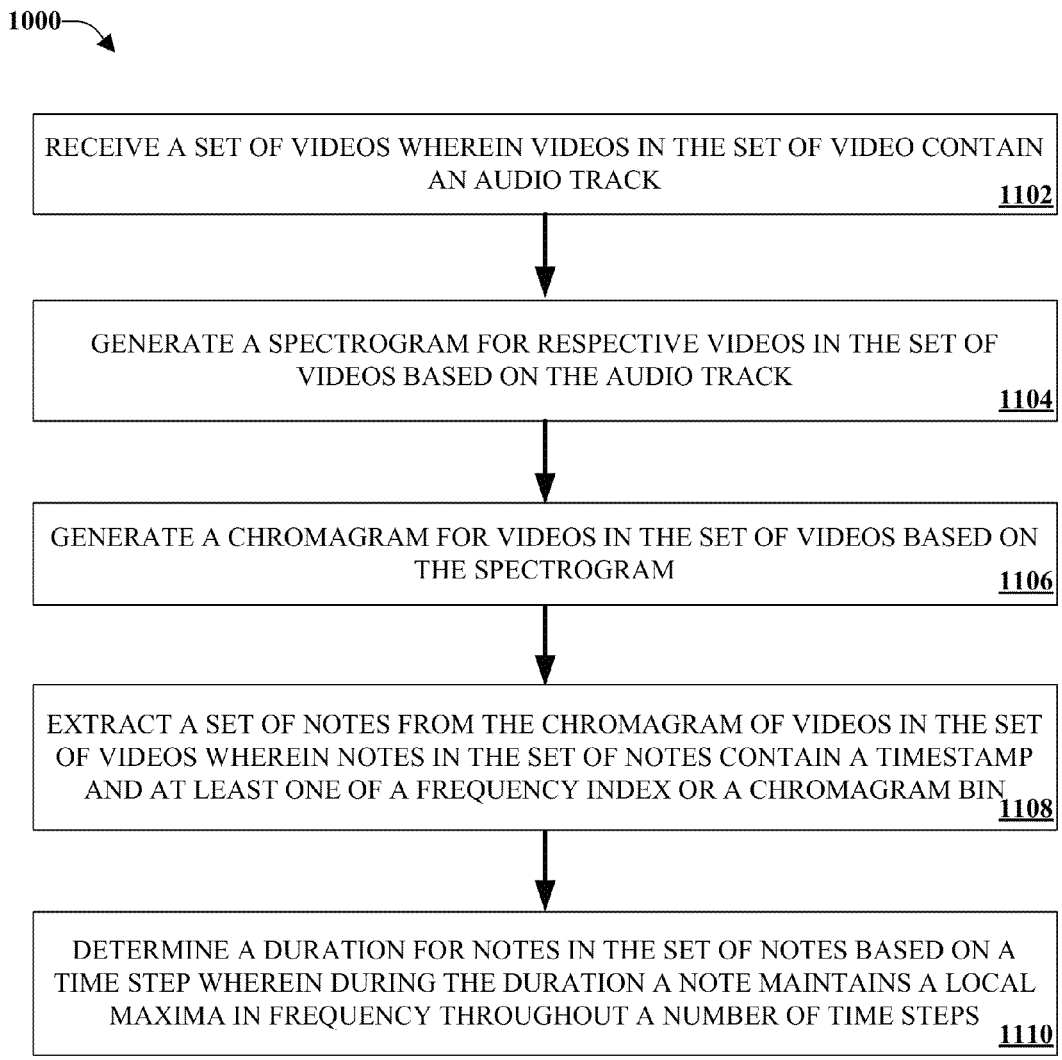
FIG. 11 illustrates an example method for building game data including determining durations for notes in accordance with implementations of this disclosure.

Referring now to FIG. 11, there is illustrated an example method for building game data including determining durations for notes in accordance with implementations of this disclosure. At 1102, a set of videos can be received (e.g., by a receiving component) wherein videos in the set of videos contain an audio track. At 1104, a spectrogram can be generated (e.g., by a spectrogram component) for respective videos in the set of videos based on the audio track. At 1106, a chromagram can be generated (e.g., by a chromagram component) for videos in the set of videos based on the spectrogram. At 1108, a set of notes can be extracted (e.g., by a note extraction component) from the chromagram of videos in the set of videos wherein notes in the set of notes contain a timestamp and at least one of a frequency index or a chromagram bin.

At 1110, a duration for notes in the set of notes can be determined (e.g., by a note extension component) based on a time step wherein during the duration a note maintains a local maxima in frequency throughout a number of time steps.

Figure 12:
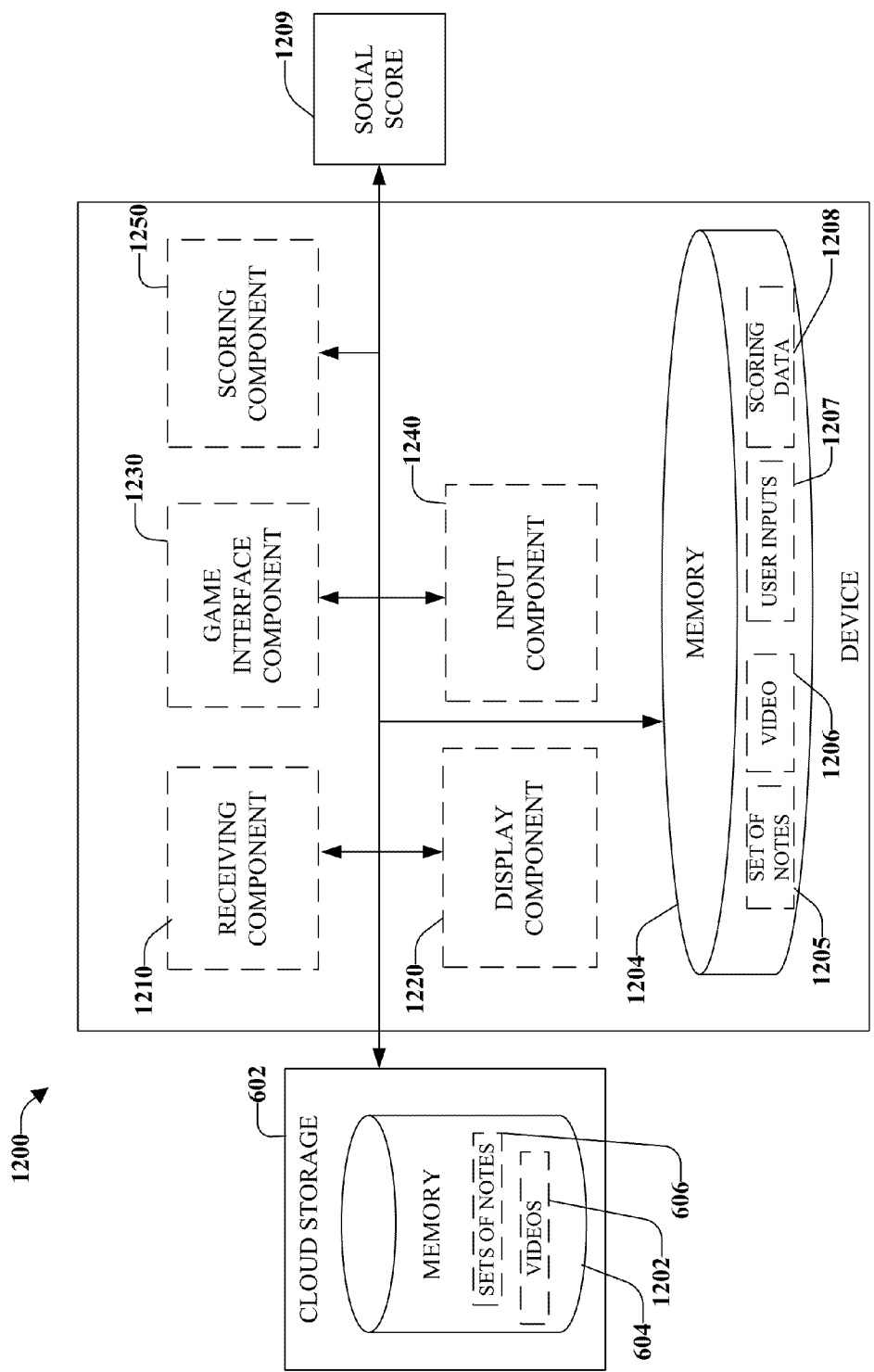
FIG. 12 illustrates a high-level functional block diagram of an example device using game data to play interactive games in accordance with implementations of this disclosure.

Referring now to FIG. 12 there is illustrated a high-level functional block diagram of an example device using game data to play interactive games in accordance with implementations of this disclosure. Device 1200 contains a receiving component 1210, a display component 1220, a game interface component 1230, an input component 1240, a scoring component 1250, and a memory 1204. Device 1200 can be connected to various input devices (not shown) such as a keyboard, a mouse, or a touch screen. A device can include a smart phone, a tablet, an e-reader, a personal digital assistant, a desktop computer, a laptop computer, a server, etc. Receiving component 1210 can receive a video and an associated set of notes wherein notes in the set of notes contain a time and a frequency bin. In one implementation, notes in the set of notes can further contain a duration. Receiving component 1210 can be communicatively coupled to cloud storage 602 to retrieve videos 1202 or sets of notes 606 within memory 604. Receiving component 1210 can store the set of notes 1205 and the video 1206 within memory 1204 for local access by other components.

Display component 1220 can display the video. It can be appreciated that display component 1220 can display the video within the game interface. Game interface component 1230 can, during display of the video, dynamically display notes within the set of notes as a button of a set of buttons based on the time and the frequency bin associated with the note wherein the set of buttons are associated with differing user inputs. In one implementation, user inputs can include at least one of keyboard strikes, mouse clicks, or touch screen touches. It can be appreciated that displayed buttons can reflect the associated user input. For example, if the keyboard key "a" is associated with one of the buttons, that button can be displayed as "a" on the game interface. In one implementation, game interface component 1230 can simultaneously display at least two notes wherein the simultaneously displayed notes are associated with differing buttons among the set of buttons. In another implementation, game interface component can selectively display notes within the set of notes based on a difficulty level. For example, on an easier difficulty level, some notes can be skipped, i.e., not displayed. In another example, less buttons can be used based on a difficulty level, and due to less buttons, not all notes need be displayed. For example, a four note chord on a five button interface cannot be displayed as four notes on a three button interface. In another implementation, receiving component 1210 can further dynamically receive at least one social score, wherein the game interface component 1230 further dynamically displays the social score.

Input component 1240 can receive user inputs from the device 1200 during display of the video. In one implementation, input component 1240 can receive a user input duration for respective user inputs. For example if the keyboard key "s" is a user input, the duration a user holds down the "s" button can also be a user input. Input component 1240 can store received user inputs in memory 1204 for access by other components.

Scoring component 1250 can dynamically score user inputs as accurate or inaccurate based on displayed notes. In one implementation, scoring component 1250 can dynamically score user inputs further based on the user input duration for respective user inputs and the duration of the displayed note. For example, a duration threshold can be established where a player must press the user input for at least, 80% of the note duration associated with the displayed note. Scoring component 1250 can store scoring data 1208 within memory 1204 for access by other components.

Figure 13:
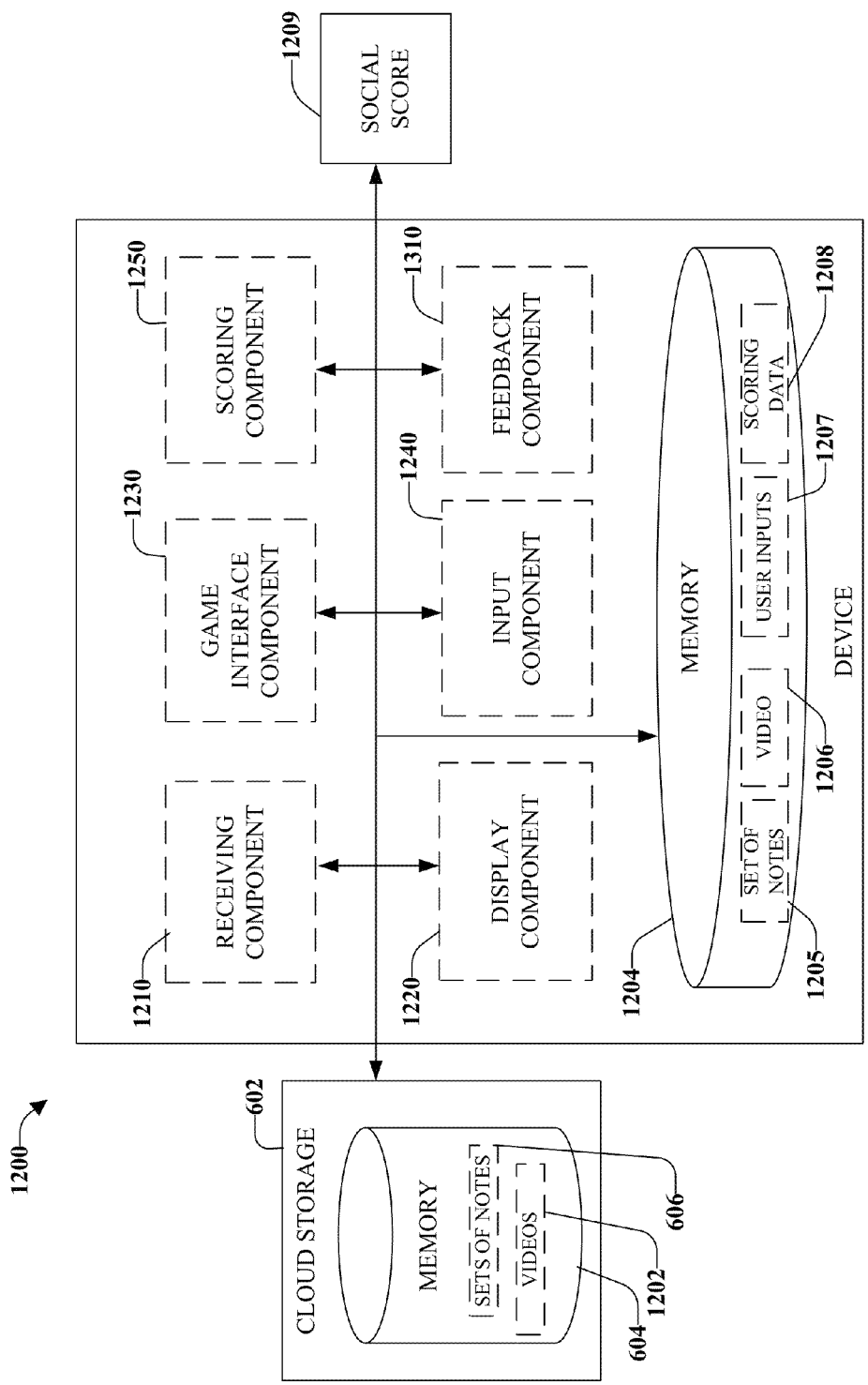
FIG. 13 illustrates a high-level functional block diagram of an example device using game data to play interactive games including a feedback component in accordance with implementations of this disclosure.

Referring now to FIG. 13 there is illustrated a high-level functional block diagram of an example device using game data to play interactive games including a feedback component 1310 in accordance with implementations of this disclosure. Feedback component 1310 can provide audible feedback during display of the video based on whether user inputs are accurate or inaccurate wherein inaccurate user inputs provide audible distortions into the video and accurate user inputs provide a tone based on the frequency bin associated with the displayed note. In another implementation, the tone based on the frequency bin associated with the displayed note can be played by an instrument selected by the player, where the preference is stored on the device, or by an instrument correlating to the music.

Figure 14:
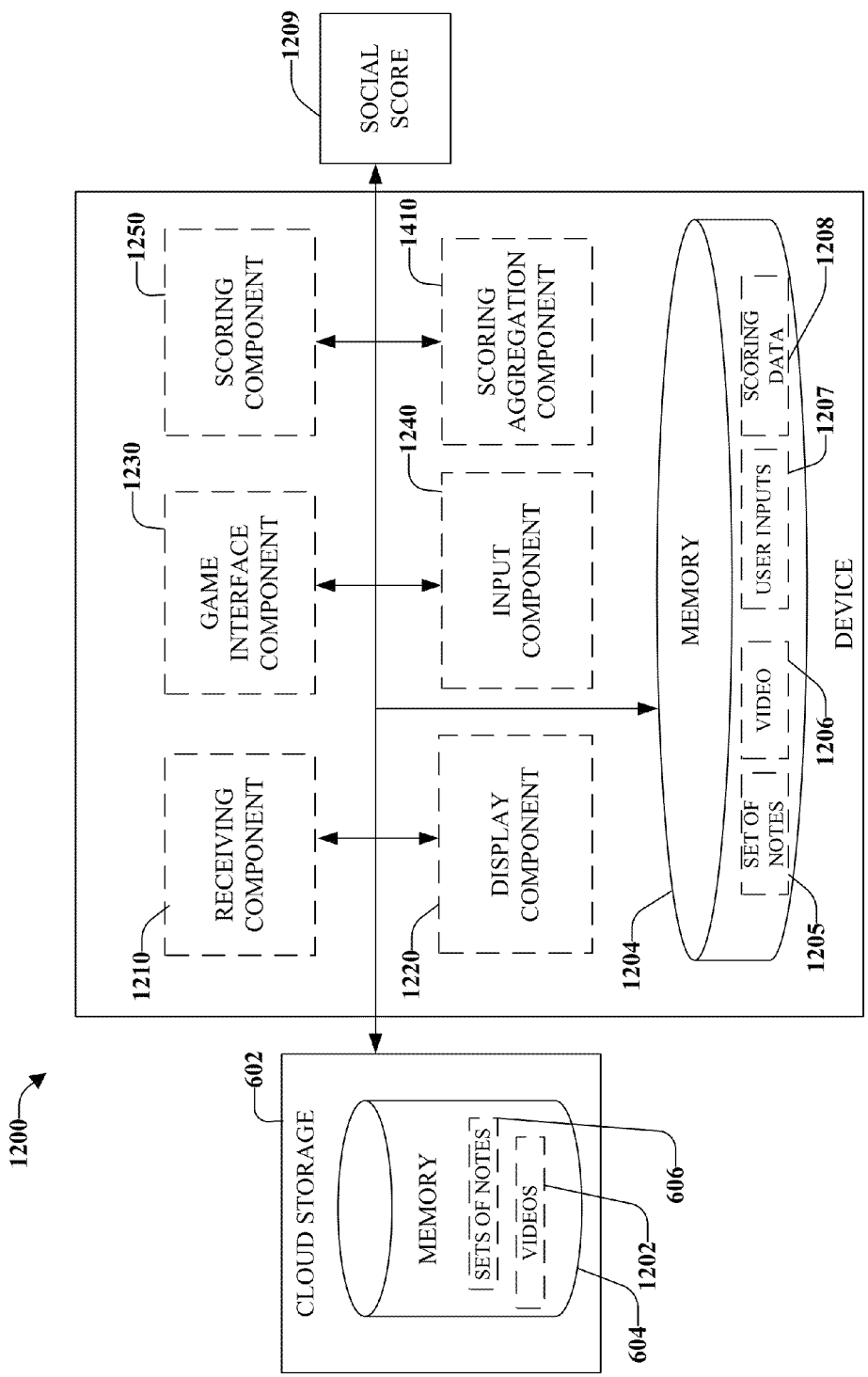
FIG. 14 illustrates a high-level functional block diagram of an example device using game data to play interactive games including a scoring aggregation component in accordance with implementations of this disclosure.

Referring now to FIG. 14, there is illustrated a high-level functional block diagram of an example device using game data to play interactive games including a scoring aggregation component 1410 in accordance with implementations of this disclosure. Scoring aggregation component 1410 can determine a score based on dynamically aggregating accurate user inputs and inaccurate user inputs, wherein the game interface component 1230 further displays the score.

Figure 15:
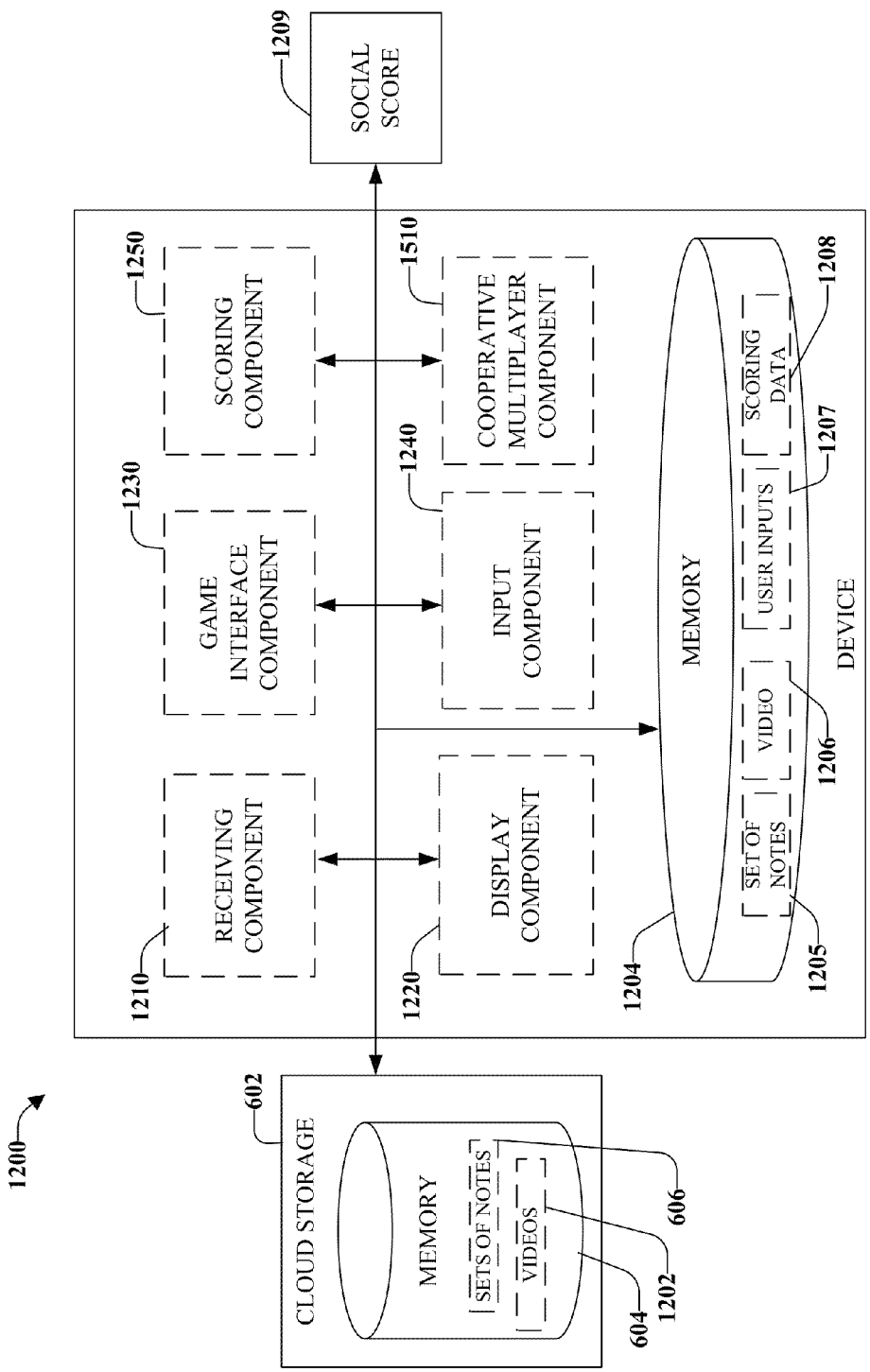
FIG. 15 illustrates a high-level functional block diagram of an example device using game data to play interactive games including a cooperative multiplayer component in accordance with implementations of this disclosure.

Referring now to FIG. 15, there is illustrated a high-level functional block diagram of an example device using game data to play interactive games including a cooperative multiplayer component 1510 in accordance with implementations of this disclosure. Cooperative multiplayer component 1510 can divide the set of notes into subsets of notes, wherein the game interface component 1230 can display notes within at least one subset of notes. For example, the set of notes can be divided into parts, i.e., subsets, whereby players play differing subset of notes. It can be appreciated that the subsets need not be mutually exclusive. In one implementation, differing subsets of notes are related to differing instruments.

Figure 16:
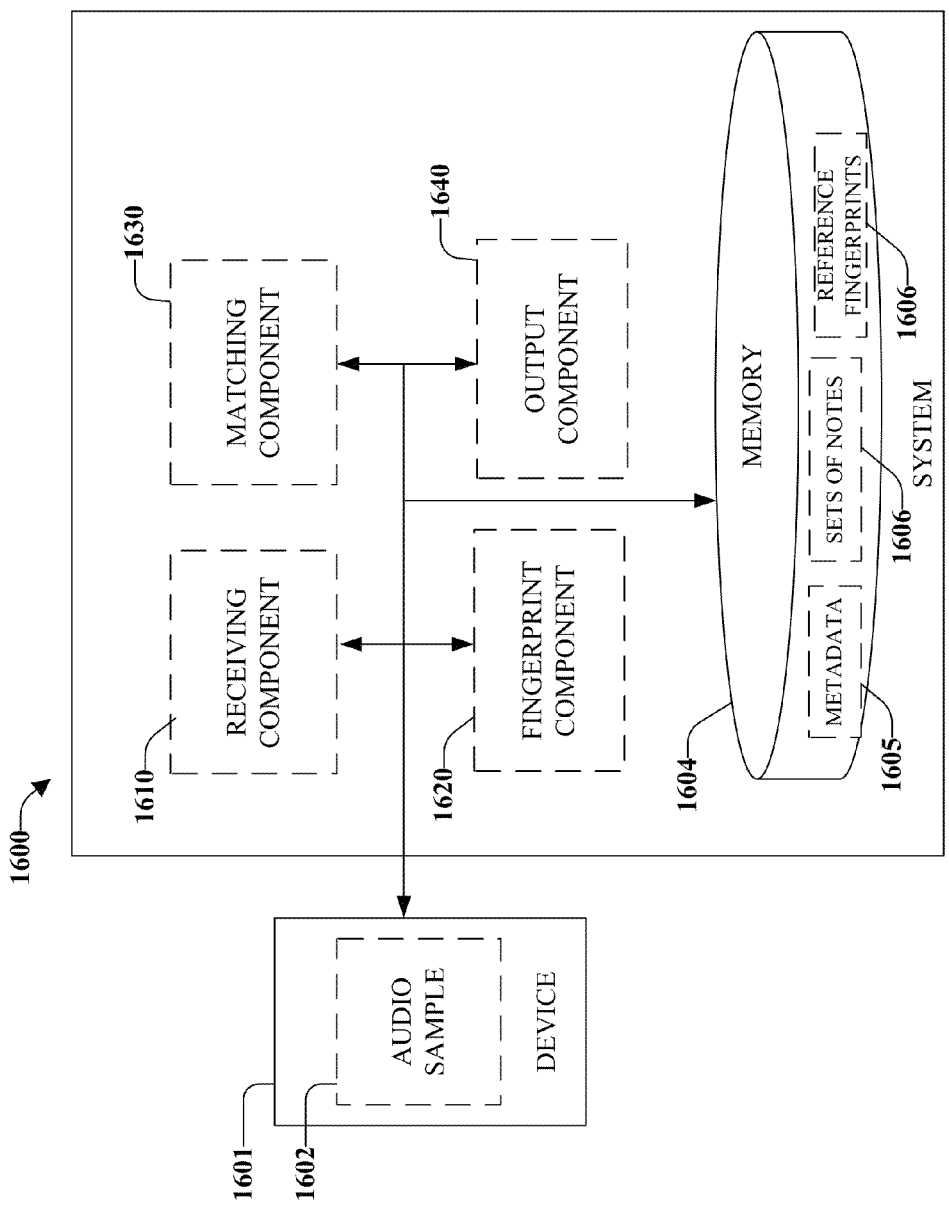
FIG. 16 illustrates a high-level functional block diagram of an example system for building musical score data relating to audio samples in accordance with implementations of this disclosure.

Referring now to FIG. 16, there is illustrated a high-level functional block diagram of an example system for building musical score data relating to audio samples in accordance with implementations of this disclosure. System 1600 contains a receiving component 1610, a fingerprint component 1620, a matching component 1630, an output component 1640, and a memory 1604. Receiving component 1610 can receive an audio sample 1602, from, for example, device 1601.

Fingerprint component 1620 can generate a set of fingerprints based on the audio sample. Matching component 1630 can identify the audio sample based on comparing the set of fingerprints to a set of reference fingerprints wherein the matching component further determines a correspondence point a time stretch factor. The earliest identified point in both the audio sample and the reference sample where a match is identified can be determined to be the correspondence point. For example, it might be 2.4 seconds into the audio sample and onwards matches 200.2 seconds and onwards in the matching reference sample. The audio sample time and the reference sample time associated with the correspondence point would be 2.4 seconds and 200.2 seconds respectively in this example. In addition to the correspondence point, matching component can also identify a time stretch factor that details any speed mismatch between the audio sample and the reference sample.

Output component 1640 can output metadata related to the identity of the audio sample, a set of note associated with the audio sample, an audio sample time and a reference sample time associated with the correspondence point, and the time stretch factor, to, for example, device 1601.

Figure 17:
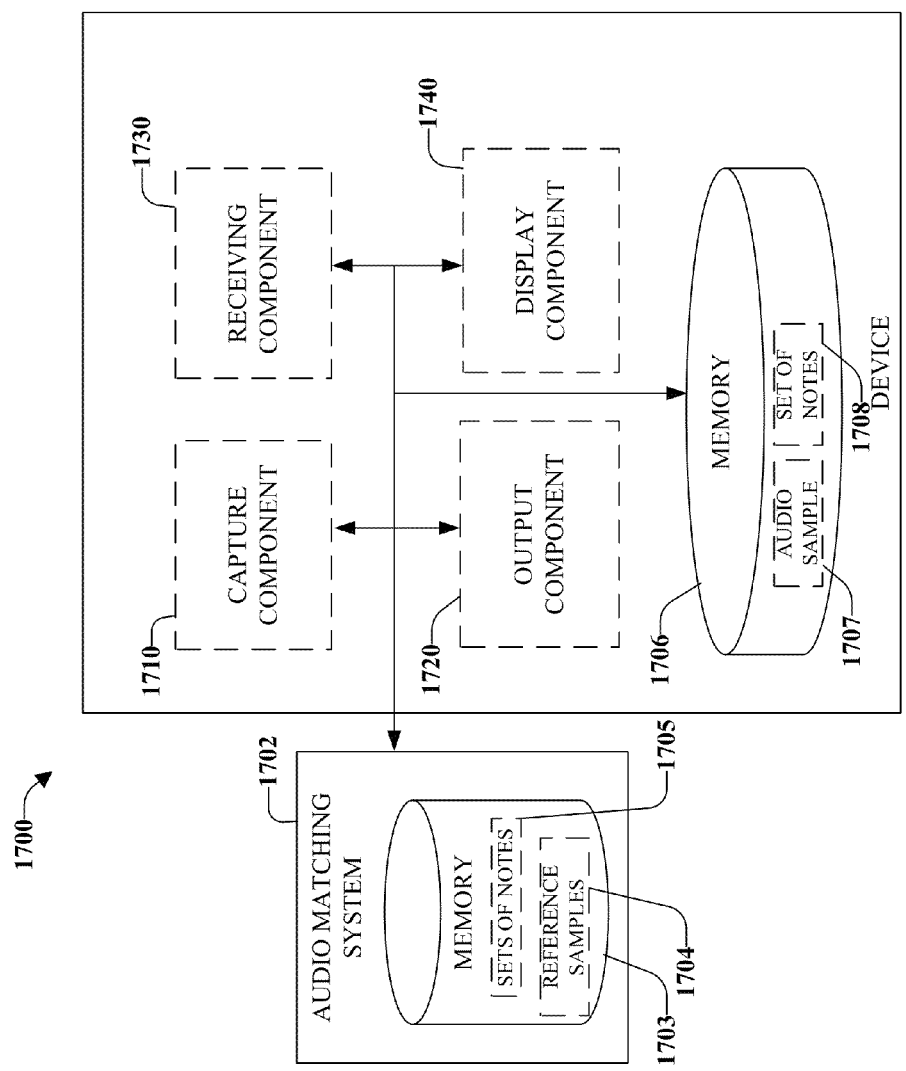
FIG. 17 illustrates a high-level functional block diagram of an example device using musical score data to dynamically display a musical score in accordance with implementations of this disclosure.

Referring now to FIG. 17, there is illustrated a high-level functional block diagram of an example device using musical score data to dynamically display a musical score in accordance with implementations of this disclosure. Device 1700 contains a capture component 1710, an output component 1720, a receiving component 1730, a display component 1740, and a memory 1706. Device 1700 can be connected to various input devices (not shown) such as a keyboard, a mouse, a microphone, or a touch screen. A device can include a smart phone, a tablet, an e-reader, a personal digital assistant, a desktop computer, a laptop computer, a server, etc.

Capture component 1710 can capture an audio sample and from at least one of the microphone or the memory 1604 wherein the audio sample is associated with an initial time stamp. For example, the initial time stamp can be from the system clock on the device at the time the audio sample begins being captured.

Output component 1720 can send the audio sample and the initial time stamp to an audio matching system 1702. Audio matching system 1702 can function similarly to the system described relating to FIG. 16, whereby it receives an audio sample and initial time stamp from device 1700.

Receiving component 1730 can, in response to the output component sending the audio sample and the initial time stamp, receive metadata relating to the audio sample, a set of notes, a correspondence point, and a time stretch factor wherein the correspondence point is associated with an audio sample correspondence time and a reference sample correspondence time. For example, receiving component 1730 can received information from the system as described more fully relating to FIG. 16.

Display component 1740 can, during playback of the audio sample, dynamically display notes in the set of notes based on a current time stamp, the initial time stamp, the audio sample correspondence time, the reference sample correspondence time, and the time stretch factor. Notes can be displayed as a musical score depicted on a musical scale, and can appear on the scale in real time during playback of the audio sample.

In one example, where the time stretch factor is not applicable, e.g., the audio sample and the reference sample are time stretch aligned, the exact time in the reference sample can be computed as the current time stamp minus the initial time stamp minus the audio sample correspondence point plus the reference sample correspondence time. It can be appreciated that the current time stamp is the dynamically changing variable whereby as it changes, display component can dynamically determine the reference time and notes within the set of notes associated with the specific reference time.

In another example, where the time stretch factor is applicable, e.g., the audio sample and the reference sample are not time stretch aligned, the exact time in the reference sample can be computed by multiplying the time stretch factor by the current time stamp minus the initial time stamp minus the audio sample correspondence point and then adding the reference sample correspondence time to the product.

Figure 18:
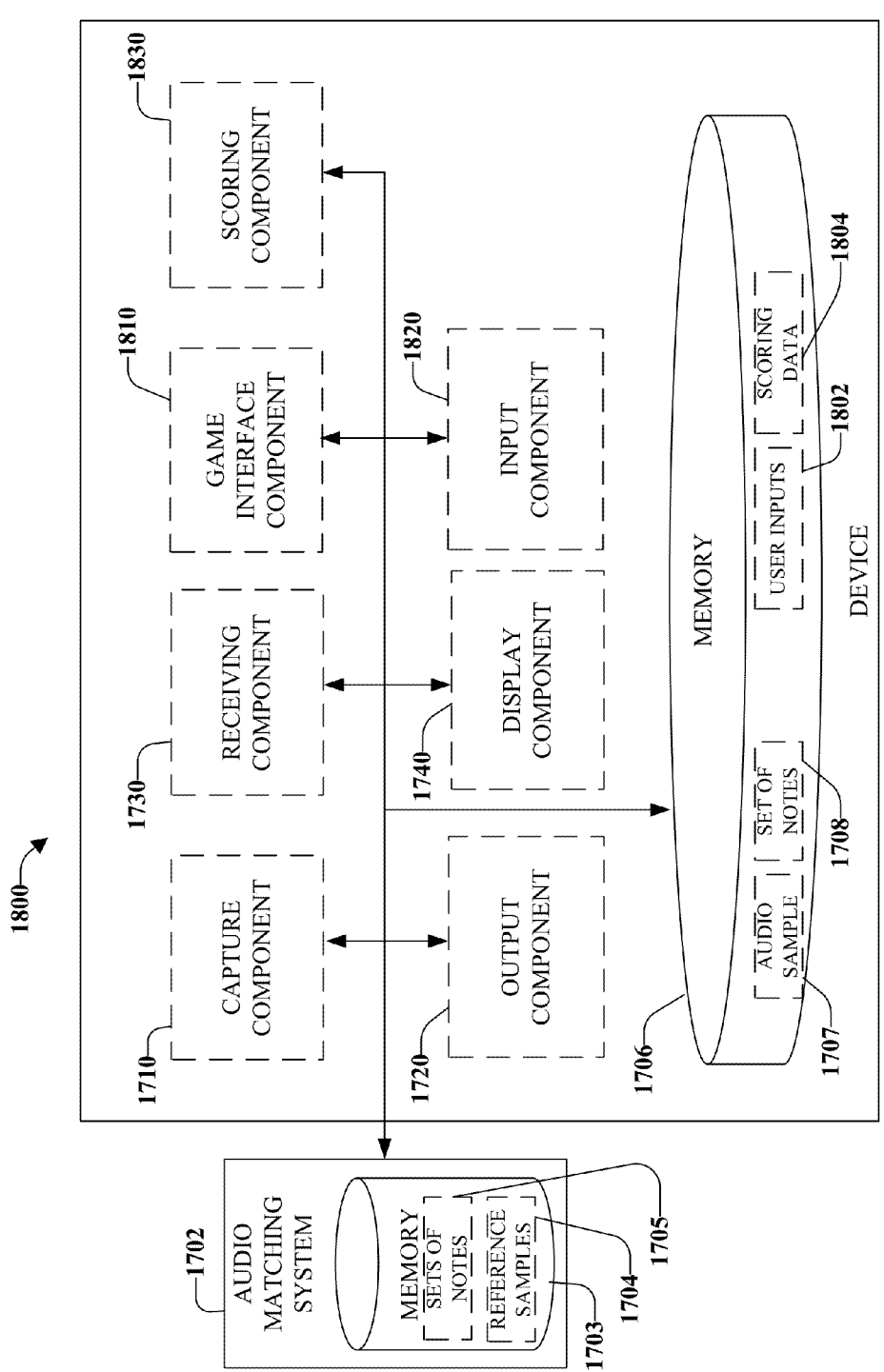
FIG. 18 illustrates a high-level functional block diagram of an example device using musical score data to play interactive games in accordance with implementations of this disclosure.

Referring now to FIG. 18, there is illustrated a high-level functional block diagram of an example device using musical score data to play interactive games in accordance with implementations of this disclosure.

Game interface component 1810 can, during display of notes in the set of notes, dynamically display notes within the set of notes as buttons within a set of buttons based on the time and the frequency bin associated with the note wherein the set of buttons are associated with differing user inputs. In one implementation, user inputs can include at least one of keyboard strikes, mouse clicks, or touch screen touches. It can be appreciated that displayed buttons can reflect the associated user input. For example, if the keyboard key "a" is associated with one of the buttons, that button can be displayed as "a" on the game interface. In one implementation, game interface component 1810 can simultaneously display at least two notes wherein the simultaneously displayed notes are associated with differing buttons among the set of buttons. In another implementation, game interface component can selectively display notes within the set of notes based on a difficulty level. For example, on an easier difficulty level, some notes can be skipped, i.e., not displayed. In another example, less buttons can be used based on a difficulty level, and due to less buttons, not all notes need be displayed. For example, a four note chord on a five button interface cannot be displayed as four notes on a three button interface.

Input component 1820 can receive user inputs from the device 1800 during display of the video. In one implementation, input component 1820 can receive a user input duration for respective user inputs. For example if the keyboard key "s" is a user input, the duration a user holds down the "s" button can also be a user input. Input component 1820 can store received user inputs 1802 in memory 1706 for access by other components.

Scoring component 1830 can dynamically score user inputs as accurate or inaccurate based on displayed notes. In one implementation, scoring component 1830 can dynamically score user inputs further based on the user input duration for respective user inputs and the duration of the displayed note. For example, a duration threshold can be established where a player must press the user input for at least, 80% of the note duration associated with the displayed note. Scoring component 1830 can store scoring data 1804 within memory 1706 for access by other components.

Figure 19:
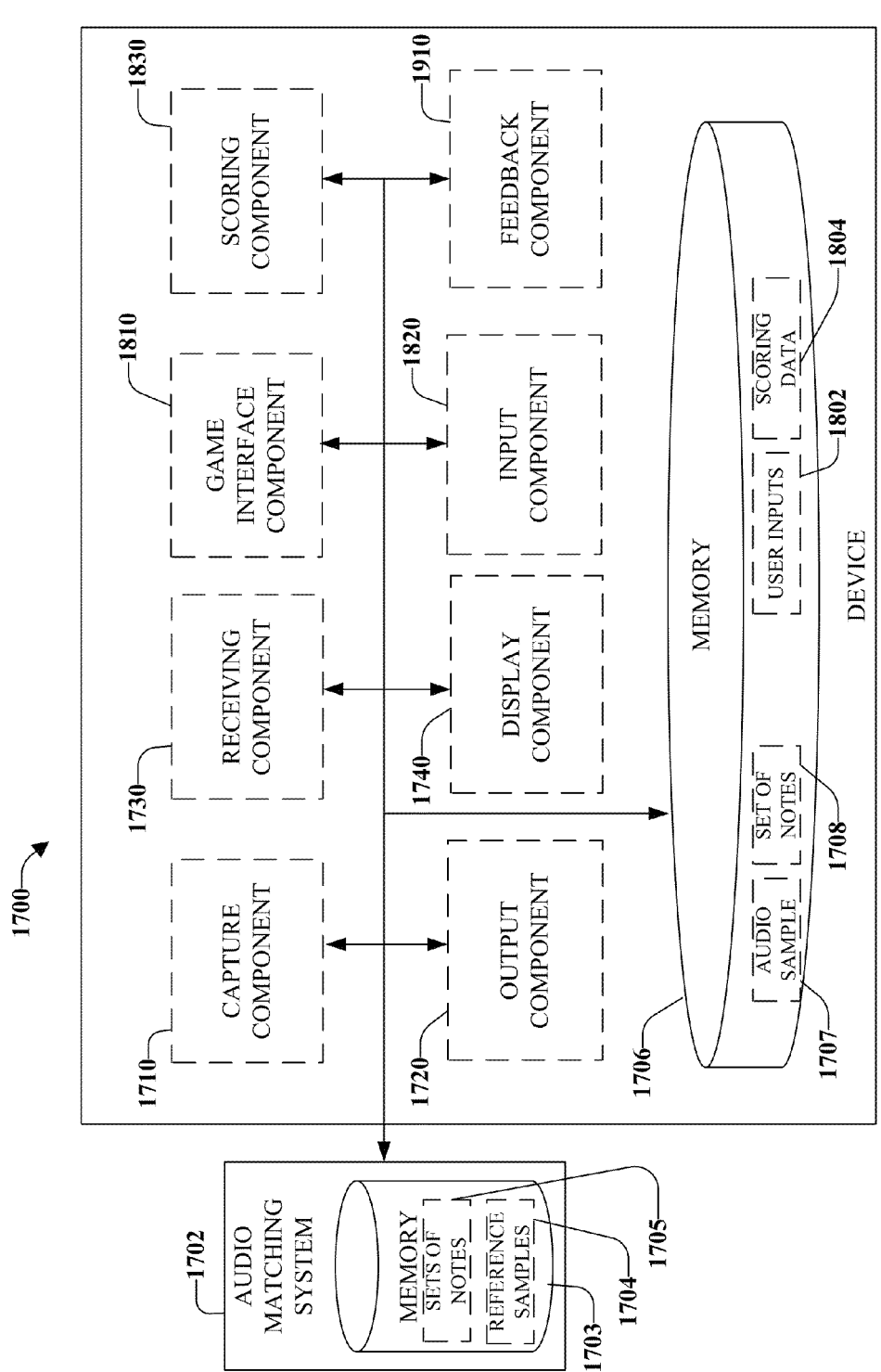
FIG. 19 illustrates a high-level functional block diagram of an example device using musical score data to play interactive games including a feedback component in accordance with implementations of this disclosure.

Referring now to FIG. 19, there is illustrated a high-level functional block diagram of an example device using musical score data to play interactive games including a feedback component in accordance with implementations of this disclosure. Feedback component 1910 can provide audible feedback during display of the notes based on whether user inputs are accurate or inaccurate wherein inaccurate user inputs provide audible distortions and accurate user inputs provide a tone based on the frequency bin associated with the displayed note. In another implementation, the tone based on the frequency bin associated with the displayed note can be played by an instrument selected by the player, where the preference is stored on the device, or by an instrument correlating to the music.

Figure 20:
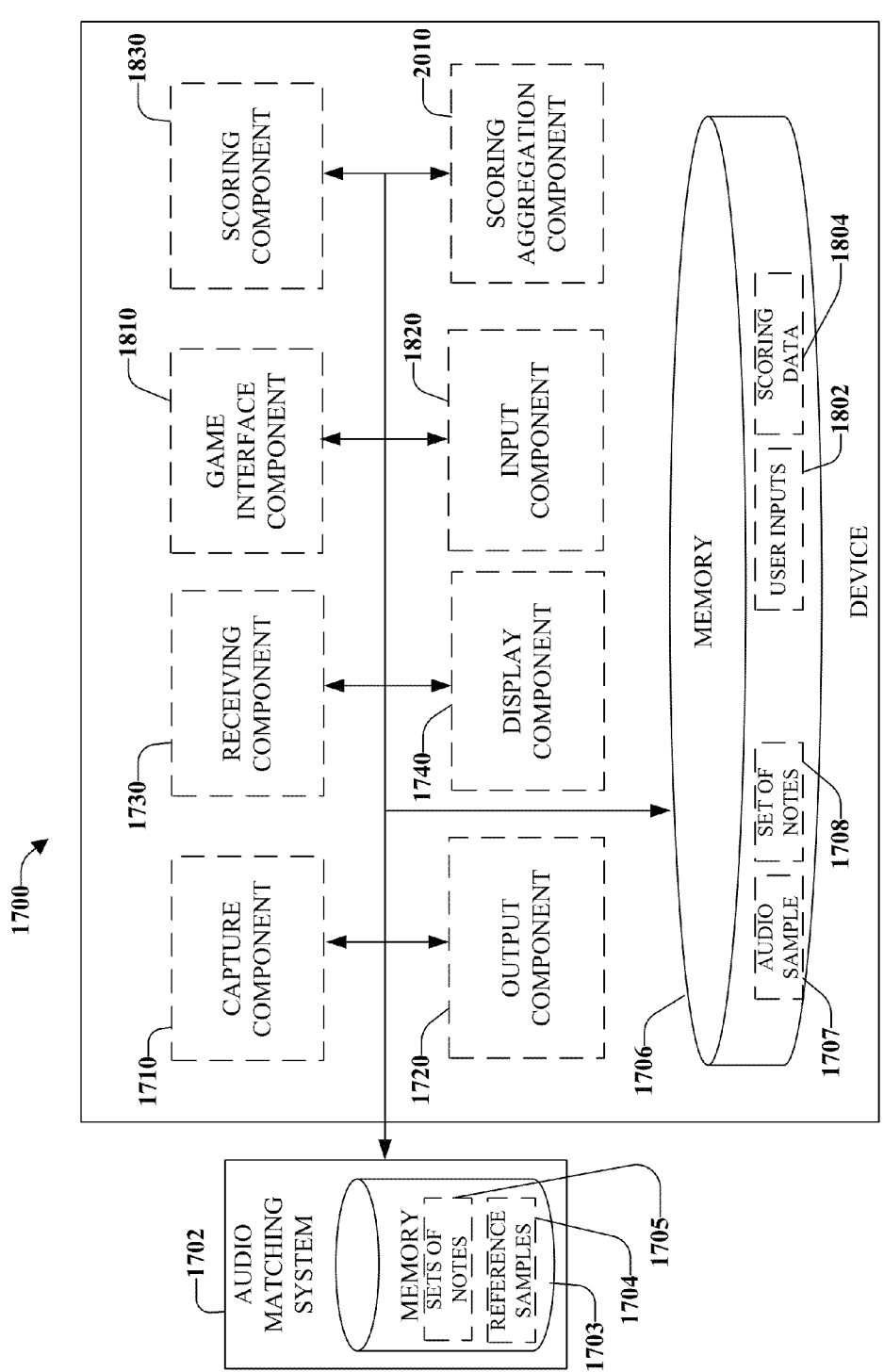
FIG. 20 illustrates a high-level functional block diagram of an example device using musical score data to play interactive games including a scoring aggregation component in accordance with implementations of this disclosure.

Referring now to FIG. 20, there is illustrated a high-level functional block diagram of an example device using musical score data to play interactive games including a scoring aggregation component in accordance with implementations of this disclosure. Scoring aggregation component 2010 can determine a score based on dynamically aggregating accurate user inputs and inaccurate user inputs, wherein the game interface component 1810 further displays the score.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 21:
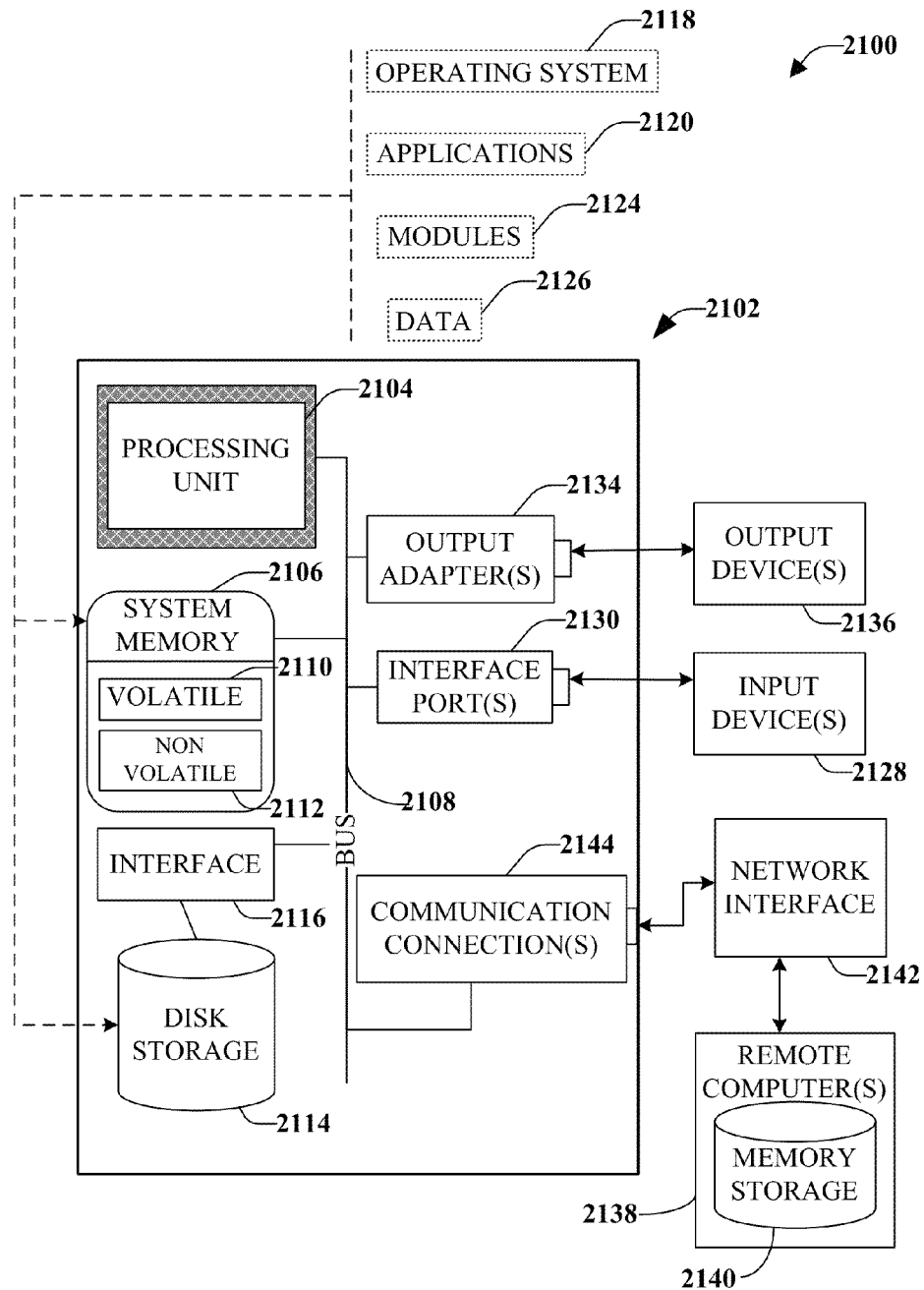
FIG. 21 illustrates an example block diagram of a computer operable to execute the disclosed architecture in accordance with implementations of this disclosure.

With reference to FIG. 21, a suitable environment 2100 for implementing various aspects of the claimed subject matter includes a computer 2102. It is to be appreciated that the computer, 2102 can be used in connection with implementing one or more of the systems or components shown and described in connection with FIGS. 1-4. The computer 2102 includes a processing unit 2104, a system memory 2106, and a system bus 2108. The system bus 2108 couples system components including, but not limited to, the system memory 2106 to the processing unit 2104. The processing unit 2104 can be any of various available processors. Dual microprocessors and other multiprocessor architectures also can be employed as the processing unit 2104.

The system bus 2108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2106 includes volatile memory 2110 and non-volatile memory 2112. The basic input/output system (BIOS), containing the basic routines to transfer information between elements within the computer 2102, such as during start-up, is stored in non-volatile memory 2112. By way of illustration, and not limitation, non-volatile memory 2112 can include read only memory (ROM), programmable ROM (PROM), electrically programmable ROM (EPROM), electrically erasable programmable ROM (EEPROM), or flash memory. Volatile memory 2110 includes random access memory (RAM), which acts as external cache memory. According to present aspects, the volatile memory may store the write operation retry logic (not shown in FIG. 21) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 2102 may also include removable/non-removable, volatile/non-volatile computer storage media. FIG. 21 illustrates, for example, a disk storage 2114. Disk storage 2114 includes, but is not limited to, devices like a magnetic disk drive, solid state disk (SSD) floppy disk drive, tape drive, Jaz drive, Zip drive, LS-100 drive, flash memory card, or memory stick. In addition, disk storage 2114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2114 to the system bus 2108, a removable or non-removable interface is typically used, such as interface 2116.

It is to be appreciated that FIG. 21 describes software that acts as an intermediary between users and the basic computer resources described in the suitable operating environment 2100. Such software includes an operating system 2118. Operating system 2118, which can be stored on disk storage 2114, acts to control and allocate resources of the computer system 2102. Applications 2120 take advantage of the management of resources by operating system 2118 through program modules 2124, and program data 2126, such as the boot/shutdown transaction table and the like, stored either in system memory 2106 or on disk storage 2114. It is to be appreciated that the claimed subject matter can be implemented with various operating systems or combinations of operating systems.

A user enters commands or information into the computer 2102 through input device(s) 2128. Input devices 2128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2104 through the system bus 2108 via interface port(s) 2130. Interface port(s) 2130 include, for example, a serial port, a parallel port, a game port, and a universal serial bus (USB). Output device(s) 2136 use some of the same type of ports as input device(s) 2128. Thus, for example, a USB port may be used to provide input to computer 2102, and to output information from computer 2102 to an output device 2136. Output adapter 2134 is provided to illustrate that there are some output devices 2136 like monitors, speakers, and printers, among other output devices 2136, which require special adapters. The output adapters 2134 include, by way of illustration and not limitation, video and sound cards that provide a means of connection between the output device 2136 and the system bus 2108. It should be noted that other devices and/or systems of devices provide both input and output capabilities such as remote computer(s) 2138.

Computer 2102 can operate in a networked environment using logical connections to one or more remote computers, such as remote computer(s) 2138. The remote computer(s) 2138 can be a personal computer, a server, a router, a network PC, a workstation, a microprocessor based appliance, a peer device, a smart phone, a tablet, or other network node, and typically includes many of the elements described relative to computer 2102. For purposes of brevity, only a memory storage device 2140 is illustrated with remote computer(s) 2138. Remote computer(s) 2138 is logically connected to computer 2102 through a network interface 2142 and then connected via communication connection(s) 2144. Network interface 2142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2144 refers to the hardware/software employed to connect the network interface 2142 to the bus 2108. While communication connection 2144 is shown for illustrative clarity inside computer 2102, it can also be external to computer 2102. The hardware/software necessary for connection to the network interface 2142 includes, for exemplary purposes only, internal and external technologies such as, modems including regular telephone grade modems, cable modems and DSL modems, ISDN adapters, and wired and wireless Ethernet cards, hubs, and routers.

Figure 22:
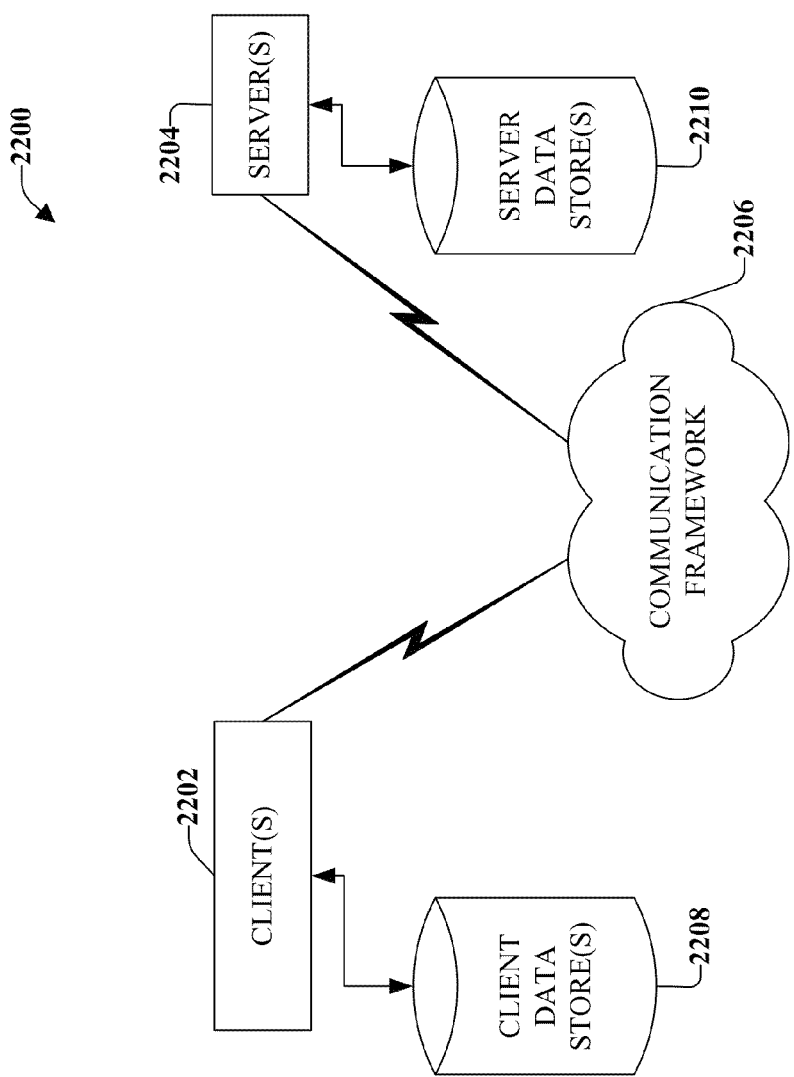
FIG. 22 illustrates an example schematic block diagram for a computing environment in accordance with implementations of this disclosure.

Referring now to FIG. 22, there is illustrated a schematic block diagram of a computing environment 2200 in accordance with the subject specification. The system 2200 includes one or more client(s) 2202, which can include an application or a system that accesses a service on the server 2204. The client(s) 2202 can be hardware and/or software (e.g., threads, processes, computing devices). The client(s) 2202 can house cookie(s), metadata, and/or associated contextual information. The client can house thread to perform, for example, receiving a set of videos, receiving a set of audio samples, generating a spectrogram, generating a chromagram, extracting notes, storing sets of notes, filtering sets of videos, classifying audio, classifying video, reading metadata, etc. in accordance with the subject disclosure.

The system 2200 also includes one or more server(s) 2204. The server(s) 2204 can also be hardware or hardware in combination with software (e.g., threads, processes, computing devices). The servers 2204 can house threads to perform, for example, receiving a set of videos, receiving a set of audio samples, generating a spectrogram, generating a chromagram, extracting notes, storing sets of notes, filtering sets of videos, classifying audio, classifying video, reading metadata, etc. in accordance with the subject disclosure. One possible communication between a client 2202 and a server 2204 can be in the form of a data packet adapted to be transmitted between two or more computer processes where the data packet contains, for example, a video, a set of notes, a social score, etc. The data packet can include a cookie and/or associated contextual information, for example. The system 2200 includes a communication framework 2206 (e.g., a global communication network such as the Internet) that can be employed to facilitate communications between the client(s) 2202 and the server(s) 2204.

Communications can be facilitated via a wired (including optical fiber) and/or wireless technology. The client(s) 2202 are operatively connected to one or more client data store(s) 2208 that can be employed to store information local to the client(s) 2202 (e.g., cookie(s) and/or associated contextual information). Similarly, the server(s) 2204 are operatively connected to one or more server data store(s) 2210 that can be employed to store information local to the servers 2204.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
a memory that has stored thereon computer executable components; and
a processor that executes the following computer executable components stored in the memory:
a receiving component that receives a set of videos, wherein videos in the set of videos contain respective audio tracks;
a spectrogram component that generates spectrograms of the respective audio tracks;
a chromagram component that generates chromagrams of the respective audio tracks of the videos in the set of videos based on the spectrograms;
a note extraction component that extracts one or more notes from the chromagrams for the videos in the set of videos, wherein the one or more notes contain a timestamp and are associated with at least one of a frequency index or a chromagram bin; and
a data storage component that stores sets of the one or more notes in a data store and associates the sets of the one or more notes with respective videos in the set of videos.

2. The system of claim 1, wherein the spectrogram component generates the spectrograms using overlapping fast Fourier transforms.

3. The system of claim 1, further comprising:
a classification component that:
filters the set of videos; and
retains the videos with musical content based on filtering.

4. The system of claim 3, wherein the classification component also filters the set of videos based on at least one of matching the respective audio tracks, classifying the respective audio tracks, classifying features of the videos or reading metadata associated with the videos.

5. The system of claim 1, wherein the chromagram component generates the chromagrams based on a number of bins and a single octave.

6. The system of claim 1, wherein the note extraction component also extracts the one or more notes from the chromagrams based on smoothing the chromagrams to emphasize note structures satisfying a defined condition.

7. The system of claim 1, wherein the note extraction component also extracts the one or more notes from the chromagrams by locating one or more onsets, wherein the one or more onsets are local maxima of the chromagrams in frequency and time.

8. The system of claim 1, wherein the note extraction component also extracts the one or more notes from the chromagrams by detecting one or more beats within the chromagrams, wherein the one or more beats are associated with a start time, an end time or a rhythm time.

9. The system of claim 1, further comprising:
a note extension component that determines a duration for the one or more notes in the set of notes based on a time step, wherein during the duration, a note maintains a local maxima in frequency throughout a number of time steps.

10. A method comprising:
using a processor to execute computer executable components stored on a computer readable medium to perform acts comprising:
receiving a set of videos, wherein videos in the set of videos contain respective audio tracks;
generating spectrograms for the videos in the set of videos, wherein the generating the spectrograms is based on the respective audio tracks;
generating chromagrams for the videos in the set of videos based on the spectrogram, wherein the generating the chromagram is based on a number of bins and a single octave; and
extracting one of more notes from the chromagrams of the videos in the set of videos, wherein the one or more notes in the set of notes contain a timestamp and are associated with at least one of a frequency index or a chromagram bin.

11. The method of claim 10, wherein the generating the spectrograms is performed by using overlapping fast Fourier transforms.

12. The method of claim 10, further comprising:
associating the one of more notes with the videos in the set of videos; and
storing respective sets of the one or more notes in a data store.

13. The method of claim 10, further comprising:
filtering the set of videos to retain ones of the set of videos containing musical content.

14. The method of claim 13, wherein the filtering the set of videos is further based on at least one of matching the respective audio tracks, classifying the respective audio tracks, classifying features of the ones of the set of videos containing musical content or reading metadata associated with ones of the set of videos containing musical content.

15. The method of claim 10, wherein the extracting the one or more notes from the chromagrams is based on smoothing the chromagrams to emphasize note structures having a defined size.

16. The method of claim 10, wherein the extracting the one or more notes from the chromagrams by locating onsets, wherein the onsets are local maxima of the chromagrams in frequency and time.

17. The method of claim 10, wherein the extracting the one or more notes from the chromagrams comprises extracting the one or more notes by detecting one or more beats within the chromagrams, wherein the one or more beats are associated with a start time, an end time or a rhythm time.

18. The method of claim 10, further comprising:
determining a duration for one or more notes in the set of notes based on a time step, wherein during the duration, the one or more notes maintains a local maxima in frequency throughout a number of time steps.

* * * * *